(12) United States Patent
Edge et al.

(10) Patent No.: US 12,389,366 B2
(45) Date of Patent: Aug. 12, 2025

(54) SYSTEMS AND METHODS TO FACILITATE LOCATION DETERMINATION BY BEAMFORMING OF A POSITIONING REFERENCE SIGNAL

(71) Applicant: Qualcomm Incorporated, San Diego, CA (US)

(72) Inventors: Stephen William Edge, Escondido, CA (US); Sven Fischer, Nuremberg (DE); Rayman Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/471,115

(22) Filed: Sep. 20, 2023

(65) Prior Publication Data

US 2024/0023059 A1 Jan. 18, 2024

Related U.S. Application Data

(63) Continuation of application No. 17/743,431, filed on May 12, 2022, now Pat. No. 12,279,228, which is a
(Continued)

(51) Int. Cl.
*H04W 64/00* (2009.01)
*G01S 1/04* (2006.01)
(Continued)

(52) U.S. Cl.
CPC ......... *H04W 64/006* (2013.01); *G01S 1/0428* (2019.08); *G01S 5/0226* (2013.01);
(Continued)

(58) Field of Classification Search
CPC ... H04W 64/006; H04W 4/029; H04W 16/28; H04W 24/10; H04W 64/003; H04W 4/02;
(Continued)

(56) References Cited

U.S. PATENT DOCUMENTS 7,542,504 B2 6/2009 Chang et al.
8,000,273 B2 8/2011 He et al.
(Continued)

FOREIGN PATENT DOCUMENTS

CN 102422663 A 4/2012
CN 102461292 A 5/2012
(Continued)

OTHER PUBLICATIONS

"3rd Generation Partnership Project; Technical Specification Group Radio Access Network; NR; Physical Layer Procedures for Data (Release 16)", 3GPP Standard, Technical Specification, 3GPP TS 38.214, 3rd Generation Partnership Project, Mobile Competence Centre, 650, Route Des Lucioles, F-06921, Sophia-Antipolis Cedex, France, vol. RAN WG1, No. V16.0.0, Dec. 2019, Jan. 14, 2020, XP051860777, pp. 1-147.
(Continued)

*Primary Examiner* — Fred A Casca
(74) *Attorney, Agent, or Firm* — QUALCOMM Incorporated

(57) ABSTRACT

Techniques are provided for positioning of a mobile device in a wireless network using directional positioning reference signals (PRS), also referred to as PRS beamforming. In an example method, a plurality of directional PRSs are generated for at least one cell for a base station, such that each of the plurality of directional PRSs comprises at least one signal characteristic and a direction of transmission, either or both of which may be distinct or unique. The plurality of directional PRSs is transmitted within the at least one cell, such that each of the plurality of directional PRSs is transmitted in the direction of transmission. A mobile device may acquire and measure at least one of the directional PRSs which may be identified using the associated signal characteristic. The measurement may be used to assist position
(Continued)

methods such as OTDOA and ECID and to mitigate multipath.

16 Claims, 12 Drawing Sheets

Related U.S. Application Data continuation of application No. 16/782,119, filed on Feb. 5, 2020, now Pat. No. 11,496,990, which is a continuation of application No. 15/866,538, filed on Jan. 10, 2018, now Pat. No. 10,736,074.

(60) Provisional application No. 62/538,952, filed on Jul. 31, 2017.

(51) Int. Cl.
| | |
|---|---|
| *G01S 5/02* | (2010.01) |
| *G01S 5/10* | (2006.01) |
| *H04B 7/0413* | (2017.01) |
| *H04B 7/0417* | (2017.01) |
| *H04B 7/0452* | (2017.01) |
| *H04B 7/08* | (2006.01) |
| *H04L 1/02* | (2006.01) |
| *H04L 1/04* | (2006.01) |
| *H04L 5/00* | (2006.01) |
| *H04W 4/029* | (2018.01) |
| *H04W 16/28* | (2009.01) |
| *H04W 24/10* | (2009.01) |
| *H04B 7/06* | (2006.01) |
| *H04L 1/06* | (2006.01) |
| *H04L 5/22* | (2006.01) |
| *H04W 4/02* | (2018.01) |

(52) U.S. Cl.
CPC .............. *G01S 5/0236* (2013.01); *G01S 5/10* (2013.01); *H04B 7/0413* (2013.01); *H04B 7/0417* (2013.01); *H04B 7/0452* (2013.01); *H04B 7/0897* (2013.01); *H04L 1/02* (2013.01); *H04L 1/04* (2013.01); *H04L 5/005* (2013.01); *H04W 4/029* (2018.02); *H04W 16/28* (2013.01); *H04W 24/10* (2013.01); *H04W 64/003* (2013.01); *H04B 7/0617* (2013.01); *H04L 1/06* (2013.01); *H04L 5/0007* (2013.01); *H04L 5/0048* (2013.01); *H04L 5/22* (2013.01); *H04W 4/02* (2013.01)

(58) Field of Classification Search
CPC .... H04W 64/00; G01S 1/0428; G01S 5/0226; G01S 5/0236; G01S 5/10; G01S 5/02; H04B 7/0413; H04B 7/0417; H04B 7/0452; H04B 7/0897; H04B 7/0617; H04L 1/02; H04L 1/04; H04L 5/005; H04L 1/06; H04L 5/0007; H04L 5/0048; H04L 5/22

See application file for complete search history.

(56) References Cited

U.S. PATENT DOCUMENTS

| | | |
|---|---|---|
| 8,254,329 B2 | 8/2012 | Ko et al. |
| 8,254,344 B2 | 8/2012 | Akita et al. |
| 8,428,157 B2 | 4/2013 | Kakura et al. |
| 8,654,727 B2 | 2/2014 | Dai et al. |
| 8,675,752 B2 | 3/2014 | Lahtonen et al. |
| 8,718,001 B2 | 5/2014 | Zhang et al. |
| 8,750,870 B2 | 6/2014 | Palanki et al. |
| 8,855,068 B2 | 10/2014 | Qin et al. |
| 9,036,538 B2 | 5/2015 | Palanki |
| 9,326,283 B2 | 4/2016 | Shin et al. |
| 9,369,250 B2 | 6/2016 | Liu |
| 9,651,653 B2 | 5/2017 | Fischer et al. |
| 9,755,712 B1 | 9/2017 | Bultan et al. |
| 9,763,251 B2 | 9/2017 | Papasakellariou et al. |
| 9,794,039 B2 | 10/2017 | Kwak et al. |
| 9,814,015 B2 | 11/2017 | Xiao et al. |
| 9,913,239 B2 | 3/2018 | Tinnakornsrisuphap et al. |
| 10,021,667 B2 | 7/2018 | Akkarakaran et al. |
| 10,171,210 B2 | 1/2019 | Gong et al. |
| 10,333,670 B2 | 6/2019 | Rico Alvarino et al. |
| 10,716,084 B2 | 7/2020 | Wang et al. |
| 10,736,074 B2 | 8/2020 | Edge et al. |
| 11,082,183 B2 | 8/2021 | Bao et al. |
| 11,239,967 B2 | 2/2022 | Manolakos |
| 11,290,229 B2 | 3/2022 | Chuang et al. |
| 11,350,437 B2 | 5/2022 | Xiong et al. |
| 11,496,265 B2 | 11/2022 | Bao |
| 11,496,990 B2 | 11/2022 | Edge et al. |
| 11,777,764 B2 | 10/2023 | Sun et al. |
| 2003/0215035 A1 | 11/2003 | Amerga et al. |
| 2005/0271012 A1 | 12/2005 | Agrawal et al. |
| 2006/0128416 A1 | 6/2006 | Linebarger et al. |
| 2007/0002813 A1 | 1/2007 | Tenny et al. |
| 2010/0130230 A1 | 5/2010 | Aggarwal et al. |
| 2011/0003551 A1 | 1/2011 | Kameno et al. |
| 2012/0021758 A1 | 1/2012 | Gum et al. |
| 2012/0231809 A1 | 9/2012 | Siomina et al. |
| 2012/0252487 A1 | 10/2012 | Siomina et al. |
| 2012/0287882 A1 | 11/2012 | Kim et al. |
| 2013/0029669 A1 | 1/2013 | Boudreau et al. |
| 2013/0165052 A1 | 6/2013 | Chuang |
| 2013/0265962 A1 | 10/2013 | Ouchi et al. |
| 2013/0324154 A1 | 12/2013 | Raghupathy et al. |
| 2014/0073356 A1 | 3/2014 | Siomina et al. |
| 2014/0349582 A1 | 11/2014 | Xiao et al. |
| 2015/0018010 A1 | 1/2015 | Fischer |
| 2015/0063228 A1 | 3/2015 | Aldana |
| 2015/0118678 A1 | 4/2015 | Mandecki et al. |
| 2015/0124673 A1 | 5/2015 | Ouchi et al. |
| 2015/0133173 A1* | 5/2015 | Edge .................. G01S 5/08 455/456.6 |
| 2015/0188678 A1 | 7/2015 | Wu et al. |
| 2015/0263837 A1 | 9/2015 | Patel et al. |
| 2015/0289311 A1 | 10/2015 | Chang et al. |
| 2015/0382205 A1 | 12/2015 | Lee et al. |
| 2016/0065342 A1 | 3/2016 | Mirbagheri et al. |
| 2016/0094326 A1 | 3/2016 | Moon et al. |
| 2016/0095105 A1 | 3/2016 | Chen et al. |
| 2016/0165458 A1 | 6/2016 | Peng et al. |
| 2016/0192385 A1 | 6/2016 | Tooher et al. |
| 2016/0226647 A1 | 8/2016 | Wang et al. |
| 2017/0026794 A1 | 1/2017 | Baker et al. |
| 2017/0104517 A1* | 4/2017 | Kakishima .......... H04B 7/0617 |
| 2017/0111880 A1 | 4/2017 | Park et al. |
| 2017/0164315 A1 | 6/2017 | Smith |
| 2017/0180194 A1 | 6/2017 | Noh et al. |
| 2017/0201960 A1 | 7/2017 | Park et al. |
| 2017/0238298 A1 | 8/2017 | Wang et al. |
| 2017/0251497 A1 | 8/2017 | Larsson et al. |
| 2017/0288830 A1 | 10/2017 | Fischer |
| 2017/0324455 A1 | 11/2017 | Soriaga et al. |
| 2018/0006787 A1 | 1/2018 | Chen et al. |
| 2018/0020423 A1 | 1/2018 | Wang et al. |
| 2018/0049151 A1 | 2/2018 | Yoon et al. |
| 2018/0097596 A1 | 4/2018 | Palanivelu et al. |
| 2018/0098314 A1 | 4/2018 | Rico Alvarino et al. |
| 2018/0124787 A1 | 5/2018 | Wang et al. |
| 2018/0192404 A1 | 7/2018 | Maaref et al. |
| 2018/0198509 A1 | 7/2018 | Nilsson et al. |
| 2018/0217228 A1 | 8/2018 | Edge et al. |
| 2018/0287682 A1 | 10/2018 | Kwak et al. |
| 2018/0295590 A1 | 10/2018 | Abedini et al. |
| 2018/0324771 A1 | 11/2018 | Hosseini et al. |
| 2018/0375710 A1 | 12/2018 | Chae |
| 2019/0007152 A1 | 1/2019 | Yi et al. |
| 2019/0013909 A1 | 1/2019 | Li et al. |
| 2019/0020454 A1 | 1/2019 | Kim et al. |

(56) References Cited

U.S. PATENT DOCUMENTS

| | | |
|---|---|---|
| 2019/0052443 A1 | 2/2019 | Cheng et al. |
| 2019/0053287 A1 | 2/2019 | Lin et al. |
| 2019/0068315 A1 | 2/2019 | Ryden et al. |
| 2019/0068346 A1 | 2/2019 | Akkarakaran et al. |
| 2019/0081660 A1 | 3/2019 | Han et al. |
| 2019/0159182 A1 | 5/2019 | Ranta-Aho et al. |
| 2019/0165913 A1 | 5/2019 | He et al. |
| 2019/0166514 A1 | 5/2019 | Liu |
| 2019/0174440 A1 | 6/2019 | Kwak et al. |
| 2019/0174454 A1 | 6/2019 | Priyanto et al. |
| 2019/0178976 A1 | 6/2019 | Xiong et al. |
| 2019/0182899 A1 | 6/2019 | Ye et al. |
| 2019/0190669 A1 | 6/2019 | Park et al. |
| 2019/0273587 A1 | 9/2019 | Takeda et al. |
| 2019/0285722 A1 | 9/2019 | Markhovsky et al. |
| 2019/0349898 A1 | 11/2019 | Fu et al. |
| 2020/0036556 A1 | 1/2020 | Wei et al. |
| 2020/0091608 A1 | 3/2020 | Alpman et al. |
| 2020/0213161 A1 | 7/2020 | Zhang et al. |
| 2020/0220676 A1 | 7/2020 | Xu et al. |
| 2020/0235877 A1 | 7/2020 | Manolakos et al. |
| 2020/0267718 A1 | 8/2020 | Park et al. |
| 2020/0275416 A1 | 8/2020 | Haghighat et al. |
| 2020/0288482 A1 | 9/2020 | Yi et al. |
| 2020/0296716 A1 | 9/2020 | Lin et al. |
| 2020/0313732 A1 | 10/2020 | Yang et al. |
| 2020/0336264 A1 | 10/2020 | Faxer et al. |
| 2020/0351818 A1 | 11/2020 | Park et al. |
| 2021/0006372 A1 | 1/2021 | Cha et al. |
| 2021/0021447 A1 | 1/2021 | Sun |
| 2021/0036825 A1 | 2/2021 | Choi et al. |
| 2021/0070451 A1 | 3/2021 | Manolakos et al. |
| 2021/0105812 A1 | 4/2021 | Rastegardoost et al. |
| 2021/0120522 A1 | 4/2021 | Kim et al. |
| 2021/0144743 A1 | 5/2021 | Rastegardoost et al. |
| 2021/0176687 A1 | 6/2021 | Ko et al. |
| 2021/0195620 A1 | 6/2021 | Yoshimura et al. |
| 2021/0211957 A1 | 7/2021 | Kamohara et al. |
| 2021/0227509 A1 | 7/2021 | Zhang |
| 2021/0311158 A1 | 10/2021 | Akkarakaran et al. |
| 2021/0351887 A1 | 11/2021 | Qi |
| 2022/0095304 A1 | 3/2022 | Muruganathan et al. |
| 2022/0132620 A1 | 4/2022 | Yoshimura et al. |
| 2022/0377701 A1 | 11/2022 | Edge et al. |
| 2023/0080106 A1 | 3/2023 | Ji et al. |
| 2024/0113828 A1 | 4/2024 | Manolakos et al. |
| 2024/0356700 A1 | 10/2024 | Manolakos et al. |

FOREIGN PATENT DOCUMENTS

| | | |
|---|---|---|
| CN | 103004267 A | 3/2013 |
| CN | 103703814 A | 4/2014 |
| CN | 103944685 A | 7/2014 |
| CN | 104488345 A | 4/2015 |
| CN | 104885554 A | 9/2015 |
| CN | 105164930 A | 12/2015 |
| CN | 106105073 A | 11/2016 |
| CN | 106341882 A | 1/2017 |
| CN | 107733549 A | 2/2018 |
| CN | 107733563 A | 2/2018 |
| EP | 2418887 A2 | 2/2012 |
| EP | 2663144 A2 | 11/2013 |
| EP | 3041301 A1 | 7/2016 |
| EP | 3306337 A1 | 4/2018 |
| EP | 3490319 A1 | 5/2019 |
| JP | H07111675 A | 4/1995 |
| JP | 2012523738 A | 10/2012 |
| JP | 2012525724 A | 10/2012 |
| JP | 2014216951 A | 11/2014 |
| JP | 2016508217 A | 3/2016 |
| JP | 2017098960 A | 6/2017 |
| JP | 2020533860 A | 11/2020 |
| KR | 20170030773 A | 3/2017 |
| TW | 201828624 A | 8/2018 |
| WO | 2007022715 A1 | 3/2007 |
| WO | 2009096319 A1 | 8/2009 |
| WO | 2010059940 A1 | 5/2010 |
| WO | 2011085267 A2 | 7/2011 |
| WO | 2011139201 A1 | 11/2011 |
| WO | 2013112972 A1 | 8/2013 |
| WO | 2013134724 A1 | 9/2013 |
| WO | 2014105324 A1 | 7/2014 |
| WO | 2014131349 A1 | 9/2014 |
| WO | 2015027118 A1 | 2/2015 |
| WO | 2015031031 A1 | 3/2015 |
| WO | 2015138178 A1 | 9/2015 |
| WO | 2016036840 A1 | 3/2016 |
| WO | 2016065368 A1 | 4/2016 |
| WO | 2016122757 A1 | 8/2016 |
| WO | 2016155810 A1 | 10/2016 |
| WO | 2016164085 A1 | 10/2016 |
| WO | 2017040075 A1 | 3/2017 |
| WO | 2017048064 A1 | 3/2017 |
| WO | 2017126907 A1 | 7/2017 |
| WO | 2017200708 | 11/2017 |
| WO | 2018013672 A1 | 1/2018 |
| WO | 2018085145 A1 | 5/2018 |
| WO | 2018126356 A1 | 7/2018 |
| WO | 2018127137 A1 | 7/2018 |
| WO | 2018128401 A1 | 7/2018 |
| WO | 2019000180 A1 | 1/2019 |
| WO | 2019047776 A1 | 3/2019 |
| WO | 2019212246 A1 | 11/2019 |
| WO | 2020001380 A1 | 1/2020 |
| WO | 2020145873 A1 | 7/2020 |
| WO | 2021071570 A1 | 4/2021 |

OTHER PUBLICATIONS

CATT: "DL Reference Signals for NR Positioning", 3GPP TSG RAN WG1 #97, R1-1906305, V1.0 Final, 3rd Generation Partnership Project, Mobile Competence Centre, 650, Route Des Lucioles, F-06921 Sophia-Antipolis Cede, vol. RAN WG1, No. Reno, USA, May 13, 2019-May 17, 2019 May 13, 2019, XP051727755, pp. 1-17.

Ericsson: "DL Reference Signals for NR Positioning", 3GPP TSG RAN WG1 Meeting #97, R1-1907508, Reno, NV, USA, May 13-17, 2019, 27 Pages.

Ericsson, "DL Reference Signals for NR Positioning", R1-1909424, 3GPP TSG-RAN WG1 Meeting #98, Prague, CZ, Aug. 26-30, 2019 (Year: 2019), 28 Pages.

Ericsson: "Downlink Positioning Solutions: Design and Evaluations", 3GPP TSG RAN WG1 96, R1-1903139 DL Positioning Solutions, 3rd Generation Partnership Project, Mobile Competence Centre, 650, Route Des Lucioles, F-06921 Sophia-Antipolis Cedex, France, vol. RAN WG1. No. Athens. Greece, Feb. 25, 2019-Mar. 1, 2019, Feb. 15, 2019, XP051600835, 28 Pages.

Ericsson: "RAT Dependent NR Positioning Solutions", [Online] 3GPP TSG-RAN WG1 #95, R1-1813592, RAT Dependent NR Positioning Solutions, 3rd Generation Partnership Project, Mobile Competence Centre, 650, Route Des Lucioles, F-06921 Sophia-Antipolis Cedex, France, vol. RAN WG1. No. Spokane, United States, Nov. 12, 2018-Nov. 16, 2018, Nov. 11, 2018, XP051555648, 17 Pages.

Ericsson: "Uplink Positioning Solutions: Design and Evaluations", 3GPP Draft, 3GPP TSG RAN WG1 #96, R1-1903140 UL Positioning Solutions, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), XP051600836, 7 Pages, figure 1 p. 3-p. 4.

ETSI TS 138 211: "5G, NR, Physical Channels and Modulation (3GPP TS 38.211 Version 15.2.0 Release 15)", V15.2.0 (Jul. 2018), 98 Pages, 2018.

ETSI TS 138 211 V16.2.0, "Physical Channels and Modulation", 5G, NR, 3GPP TS 38.211, version 16.2.0, Release 16, Jul. 2020, pp. 1-135.

European Search Report—EP20214356—Search Authority—Munich—Mar. 30, 2021.

(56) References Cited

OTHER PUBLICATIONS

European Search Report—EP21178315—Search Authority—Berlin—Nov. 9, 2021.
European Search Report—EP21181854—Search Authority—Munich—Sep. 9, 2021.
European Search Report—EP23151386—Search Authority—Berlin—Mar. 15, 2023.
Fischer S., "Observed Time Difference of Arrival (OTDOA) Positioning in 3GPP LTE", Qualcomm Technologies Inc, Jun. 6, 2014, XP055284784, pp. 1-62, Figures 6-4, Section 6.3 LPP Procedures.
Huawei, et al., "Downlink Based Solutions for NR Positioning", 3GPP TSG RAN WG1 Ad-Hoc Meeting 1901, R1-1900036, 3rd Generation Partnership Project, Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019, XP051592962, 7 Pages.
Indian Patent Application No. 201941012233, filed Mar. 28, 2019, 102 pages.
Intel Corporation: "Design of Downlink Reference Signals for NR Positioning", 3GPP TSG RAN WG1 Meeting #97, R1-1906821, Reno, USA, May 13-17, 2019, pp. 1-17.
Intel Corporation: "DL Reference Signals for NR Positioning", R1-1908659 Intel—NRPOS DLRS, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, XP051765267, 27 pages.
Intel Corporation: "Offline Discussion Outcome on DL Reference Signals for NR", 3GPP TSG RAN WG1 Meeting #96bis, R1-1905847, Xi'an, China, Apr. 8-12, 2019, pp. 1-12.
International Preliminary Report on Patentability—PCT/US2018/039677, The International Bureau of WIPO—Geneva, Switzerland, Feb. 13, 2020.
International Preliminary Report on Patentability—PCT/US2020/014404 The International Bureau of WIPO—Geneva, Switzerland, Jul. 29, 2021.
International Preliminary Report on Patentability—PCT/US2020/024617 The International Bureau of WIPO—Geneva, Switzerland, Oct. 7, 2021.
International Preliminary Report on Patentability—PCT/US2020/026024, The International Bureau of WIPO—Geneva, Switzerland, Nov. 11, 2021.
International Preliminary Report on Patentability—PCT/US2020/048793 The International Bureau of WIPO—Geneva, Switzerland, Mar. 31, 2022.
International Search Report and Written Opinion—PCT/US2017/038723—ISA/EPO—Sep. 29, 2017.
International Search Report and Written Opinion—PCT/US2018/039677—ISA/EPO—Oct. 16, 2018.
International Search Report and Written Opinion—PCT/US2020/014404—ISA/EPO—Apr. 14, 2020.
International Search Report and Written Opinion—PCT/US2020/024617—ISA/EPO—Jun. 24, 2020.
International Search Report and Written Opinion—PCT/US2020/026024—ISAEPO—Jun. 16, 2020.
International Search Report and Written Opinion—PCT/US2020/048793—ISA/EPO—Mar. 1, 2021.
Keating R., et al., "Overview of Positioning in 5G New Radio", 2019 16th International Symposium on Wireless Communication Systems, IEEE, Aug. 27, 2019, XP033636268, pp. 320-324, p. 323-p. 324.
LG Electronics: "Discussion on Potential Enhancements for Indoor Positioning", 3GPP Draft, R1-150229 Discussion on potential enhancements for indoor positioning, 3rd Generation Partnership Project (3GPP), vol. RAN WG1, Athens, Greece; Feb. 8, 2015, pp. 1-4, XP050933443, retrieved from the Internet: URL: http://www.3gpp.org/ftp/Meetings_3GPP_SYNC/RAN1/Docs/.
Media Tek Inc: "Views on Potential Positioning Techniques", R1-1812373, 3GPP TSG-RAN WG1 Meeting #95, Spokane, USA, Nov. 12-Nov. 16, 2018, Date of Publication: Nov. 3, 2018, 6 Pages, http://www.3gpp.Org/Ftp/Tsg_ran/WG1_RL1/TSGR1_95/Docs/R1-1812373.Zip.
Mediatek Inc: "On Downlink OTDOA and Angle based Techniques", 3GPP TSG-RAN WG1 #96 Meeting, R1-1903239, Athens, Greece, Feb. 25-Mar. 1, 2019, 8 Pages.
Mediatek Inc: "On Downlink OTDOA Technique: Potential Reference Signal Design", 3GPP Draft, 3GPP TSG-RAN WG1 Ad-Hoc Meeting 1901, R1-1900203 On downlink OTDOA Technique_FINAL, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593127, 6 Pages, Sections 1-5, figures 4-5.
Mediatek Inc: "Reference Signal Design for NR Positioning", 3GPP Draft, 3GPP TSG-RAN WG1 #96bis Meeting, R1-1904500 Dl Rs Design_Final, 3rd Generation Partnership Project (3GPP), Mobile Competence Centre , 650, Route Des Lucioles, F-06921 Sophia-Antipolis Cedex, France, vol. RAN WG1. No. Xi'an, China, Apr. 8, 2019-Apr. 12, 2019, Apr. 3, 2019 (Apr. 3, 2019), XP051707240, 24 Pages, Sections 1-4, figures 2e, 2f.
NextNAV: "Synchronization for OTDOA Simulations", R1-150691, 3GPP TSG RAN WG1 Meeting #80, Athens, Greece, Feb. 9-13, 2015, 3 Pages.
Nokia., et al., "Views on DL and UL Reference Signals for NR Positioning", 3GPP TSG RAN WG1 #96bis, R1-1905262, 3rd Generation Partnership Project, Mobile Competence Centre, 650, Route Des Lucioles, F-06921 Sophia-Anti Polis Cedex, France, vol. RAN WG1, No. Xi'an, China, Apr. 8, 2019-Apr. 12, 2019, Apr. 2, 2019, XP051707399, 8 Pages, Sections 1-3, figure 3, The whole document.
Partial International Search Report—PCT/US2020/048793—ISA/EPO—Nov. 24, 2020.
Shin E., et al., "Sounding Reference Signal Measurement in LTE System", 18th International Conference on Advanced Communication Technology (ICACT), Mar. 3, 2016, pp. 755-758.
Specification of U.S. Appl. No. 62/726,480, filed Sep. 4, 2018, 28 Pages.
Specification of U.S. Appl. No. 62/740,459, filed Oct. 3, 2018, 12 Pages.
Taiwan Search Report—TW109110003—TIPO—Jul. 25, 2023.
VIVO: "Discussion on DL RS for NR Positioning", R1-1908174, 3GPP TSG RAN WG1 #98, Prague, CZ, Aug. 26-30, 2019, 13 Pages.
White Paper: "An Overview of LTE Positioning", Feb. 2012, SPIRENT, 16 Pages.
Xinwei: "Discussion on Indoor Positioning Enhancement Aided by EB/FD-MIMO", R1-154700, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 14, 2015, XP050993741, 3 Pages.
Sony: "Discussion on OTDOA NR Positioning", 3GPP TSG RAN WG2 Meeting #104, R2-1817081, Spokane, USA, Nov. 12-16, 2018, 3 pages.
Ericsson: "DL and UL Reference Signals for NR Positioning", 3GPP TSG RAN WG1 96, R1-1905461, Xi'an, P.R. China, Apr. 8, 2019-Apr. 12, 2019, Apr. 3, 2019, pp. 1-15.
U.S. Appl. No. 62/740,459, inventor Chiao-Yao; Chuang, filed Oct. 3, 2018.
Taiwan Search Report—TW107123552—TIPO—Dec. 22, 2021.
Taiwan Search Report—TW109102041—TIPO—Mar. 7, 2023.
Ericsson: "DFT size for Uplink Transmissions", 3GPP TSG-RAN WG1 #47, R1-063127, Riga, Latvia, Nov. 6, 2006-Nov. 10, 2006, 2 Pages, Nov. 1, 2006.
VIVO: "Views on NR Downlink Positioning Techniques", 3GPP TSG RAN WG1 Ad-Hoc Meeting 1901, R1-1900149, Taipei, Jan. 21-25, 2019, 6 Pages.

\* cited by examiner

SYSTEMS AND METHODS TO FACILITATE LOCATION DETERMINATION BY BEAMFORMING OF A POSITIONING REFERENCE SIGNAL

CROSS-REFERENCE TO RELATED APPLICATION

This application is a continuation of U.S. patent application Ser. No. 17/743,431, filed May 12, 2022, entitled "SYSTEMS AND METHODS TO FACILITATE LOCATION DETERMINATION BY BEAMFORMING OF A POSITIONING REFERENCE SIGNAL," which is a continuation of U.S. patent application Ser. No. 16/782,119, now U.S. Pat. No. 11,496,990, filed Feb. 5, 2020, entitled "SYSTEMS AND METHODS TO FACILITATE LOCATION DETERMINATION BY BEAMFORMING OF A POSITIONING REFERENCE SIGNAL," which is a continuation of U.S. application Ser. No. 15/866,538, now U.S. Pat. No. 10,736,074, filed Jan. 10, 2018, entitled "SYSTEMS AND METHODS TO FACILITATE LOCATION DETERMINATION BY BEAMFORMING OF A POSITIONING REFERENCE SIGNAL," which claims the benefit of U.S. Provisional Application No. 62/538,952, filed Jul. 31, 2017, entitled "SYSTEMS AND METHODS TO FACILITATE LOCATION DETERMINATION BY BEAMFORMING OF A POSITIONING REFERENCE SIGNAL," each of which is assigned to the assignee hereof and of which the entire contents are hereby incorporated herein by reference for all purposes.

BACKGROUND

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine times of arrival, time differences of arrival and/or receive time-transmit time differences. Combining these measurements with known locations for the base stations and known transmission times from each base station may enable location of the mobile device using such position methods as Observed Time Difference Of Arrival (OTDOA) or Enhanced Cell ID (ECID).

To further help location determination (e.g. for OTDOA), Positioning Reference Signals (PRS) may be transmitted by base stations in order to increase both measurement accuracy and the number of different base stations for which timing measurements can be obtained by a mobile device. However, location accuracy may be impaired by a number of factors including errors, imprecision in location measurements and multipath effects, where a PRS signal may be reflected, refracted or scattered by intervening obstacles such as trees, walls, buildings and traffic. Methods and techniques to mitigate or overcome such factors may thus be beneficial.

SUMMARY

An example of a method, at a first base station, for supporting positioning of a mobile device, according to the disclosure includes generating a plurality of directional positioning reference signals (PRSs) for at least one cell for the base station, such that each of the plurality of directional PRSs comprises at least one signal characteristic and a direction of transmission, and transmitting the each of the plurality of directional PRSs within the at least one cell, such that each of the plurality of directional PRSs is transmitted in the direction of transmission.

Implementations of such a method may include one or more of the following features. The at least one signal characteristic may include a frequency, a frequency shift, a code sequence, a muting pattern, a transmission time, or any combination thereof. Transmitting the plurality of directional PRSs within the at least one cell may include directing the plurality of directional PRSs through a controllable antenna array configured to beamform each directional PRS in the direction of transmission. The direction of transmission may include a continuous range of horizontal angles, a continuous range of vertical angles, or a combination thereof. At least one of the plurality of directional PRSs may be detectable by the mobile device to facilitate location determination of the mobile device at a location-capable device based on an observed time difference of arrival (OTDOA) position method, an angle of departure (AOD) position method, or an Enhanced Cell ID (ECID) position method, or any combination thereof. The at least one of the plurality of directional PRSs may be detectable by the mobile device based on the direction of transmission for the at least one of the plurality of directional PRSs, the at least one signal characteristic for the at least one of the plurality of directional PRSs, or a combination thereof. The method may further include sending at least one of the direction of transmission for the at least one of the plurality of directional PRSs or the at least one signal characteristic for the at least one of the plurality of directional PRSs to the mobile device. The sending may be based on broadcast within the at least one cell. The location determination at the location-capable device may include determining a presence or absence of multipath for the least one of the plurality of directional PRSs based on a direction of transmission for the least one of the plurality of directional PRSs and an approximate location for the mobile device, such that determining the location of the mobile device at the location-capable device is based, at least in part, on the determined presence or absence of multipath. The approximate location for the mobile device may be based, at least in part, on a serving cell for the mobile device. The location-capable device may include a second base station different to the first base station, the mobile device or a Location Management Function (LMF), and such that the method further includes sending the direction of transmission for the at least one of the plurality of directional PRSs to the location-capable device. The at least one cell may be a serving cell for the mobile device. At least one of the at least one signal characteristic and the direction of transmission for each of the plurality of directional PRSs may be unique.

An example of a method, at a mobile device, for supporting positioning of the mobile device, according to the disclosure includes receiving, at the mobile device, a first directional positioning reference signal (PRS) transmitted by a first base station within at least one cell for the first base station, such that the first directional PRS comprises at least one first signal characteristic and a first direction of transmission, obtaining at least one first measurement for the first directional PRS based, at least in part, on the at least one first signal characteristic, and facilitating location determination of the mobile device at a location-capable device based, at least in part, on the at least one first measurement.

Implementations of such a method may include one or more of the following features. The at least one first signal characteristic may include a carrier frequency, a frequency shift, a code sequence, a muting pattern, a bandwidth, a transmission time, or any combination thereof. The first directional PRS may be transmitted from the first base station through a controllable antenna array configured to beamform the first directional PRS in the first direction of transmission. The first direction of transmission may include a continuous range of horizontal angles, a continuous range of vertical angles, or a combination thereof. The method may further include receiving the at least one first signal characteristic for the first directional PRS from the first base station or from a Location Management Function (LMF). The at least one first measurement for the first directional PRS may include a Time Of Arrival (TOA), a Reference Signal Time Difference (RSTD), a Received Signal Strength Indication (RSSI), a Reference Signal Received Power (RSRP), a Reference Signal Received Quality (RSRQ), an Angle of Arrival (AOA), a signal propagation time, a detection of the at least one signal characteristic, or any combination thereof. The location determination of the mobile device at the location-capable device may be based on an observed time difference of arrival (OTDOA) position method, an angle of departure (AOD) position method, or an Enhanced Cell ID (ECID) position method, or any combination thereof. The location determination of the mobile device at the location-capable device may include determining a presence or absence of multipath for the first directional PRS based on the first direction of transmission and an approximate location for the mobile device, such that determining the location of the mobile device at the location-capable device is based, at least in part, on the determined presence or absence of multipath. The approximate location for the mobile device may be based, at least in part, on a serving cell for the mobile device. The location-capable device may include the first base station, or a Location Management Function (LMF), and such that the method further includes sending the at least one first measurement for the first directional PRS to the location-capable device. The method may include receiving, at the mobile device, a second directional PRS transmitted by a second base station within at least one cell for the second base station, such that the second directional PRS comprises at least one second signal characteristic and a second direction of transmission, and such that the at least one second signal characteristic and the second direction of transmission for the second directional PRS are, respectively, different from the at least one first signal characteristic and the first direction of transmission for the first directional PRS, obtaining at least one second measurement for the second directional PRS based, at least in part, on the at least one second signal characteristic for the second directional PRS, and facilitating location determination of the mobile device at the location-capable device based, at least in part, on the at least one first measurement and the at least one second measurement. The at least one cell for the first base station may be a serving cell for the mobile device. At least one of the at least one first signal characteristic and the first direction of transmission for the first directional PRS may be unique.

An example of a method, at a location-capable device, for supporting positioning of a mobile device, according to the disclosure includes obtaining at least one first measurement from the mobile device for a first directional positioning reference signal (PRS) transmitted by a first base station in at least one cell for the first base station, such that the first directional PRS comprises at least one first signal characteristic and a first direction of transmission, and determining the location of the mobile device based, at least in part, on the at least one first measurement and the first direction of transmission.

Implementations of such a method may include one or more of the following features. The at least one first signal characteristic may include a carrier frequency, a frequency shift, a code sequence, a muting pattern, a bandwidth, a transmission time, or any combination thereof. The first directional PRS may be transmitted from the first base station through a controllable antenna array configured to beamform the first directional PRS in the first direction of transmission. The first direction of transmission may include a continuous range of horizontal angles, a continuous range of vertical angles, or a combination thereof. The location-capable device may include the mobile device, and such that the method further includes receiving the at least one first signal characteristic and the first direction of transmission from the first base station or from a Location Management Function (LMF). The first direction of transmission may be received from the first base station by receiving a broadcast signal from the first base station. The location-capable device may include the first base station, or a Location Management Function (LMF), and such that the method further includes receiving the at least one first measurement from the mobile device. The method may also include sending the at least one first signal characteristic to the mobile device. The at least one first measurement for the first directional PRS may include a Time Of Arrival (TOA), a Reference Signal Time Difference (RSTD), a Received Signal Strength Indication (RSSI), a Reference Signal Received Power (RSRP), a Reference Signal Received Quality (RSRQ), an Angle of Arrival (AOA), a signal propagation time, a detection of the at least one first signal characteristic, or any combination thereof. Determining the location of the mobile device may be based on an observed time difference of arrival (OTDOA) position method, an angle of departure (AOD) position method, or an Enhanced Cell ID (ECID) position method, or any combination thereof. The method may include determining a presence or absence of multipath for the first directional PRS based on the first direction of transmission and an approximate location for the mobile device, such that determining the location of the mobile device is based, at least in part, on the determined presence or absence of multipath. The approximate location for the mobile device may be based, at least in part, on a serving cell for the mobile device. The method may include obtaining at least one second measurement from the mobile device for a second directional PRS transmitted by a second base station in at least one cell for the second base station, such that the second directional PRS comprises at least one second signal characteristic and a second direction of transmission, and such that the at least one second signal characteristic and the second direction of transmission for the second directional PRS are, respectively, different from the at least one first signal characteristic and the first direction of transmission for the first directional PRS, and determining the location of the mobile device based, at least in part, on the at least one first measurement, the at least one second measurement, the first direction of transmission for the first directional PRS and the second direction of transmission for the second directional PRS. The at least one cell for the first base station may be a serving cell for the mobile device. At least one of the at least one first signal characteristic and the first direction of transmission for the first directional PRS may be unique.

Other and further objects, features, aspects, and advantages of the present disclosure will become better understood with the following detailed description of the accompanying drawings.

Figure 1:
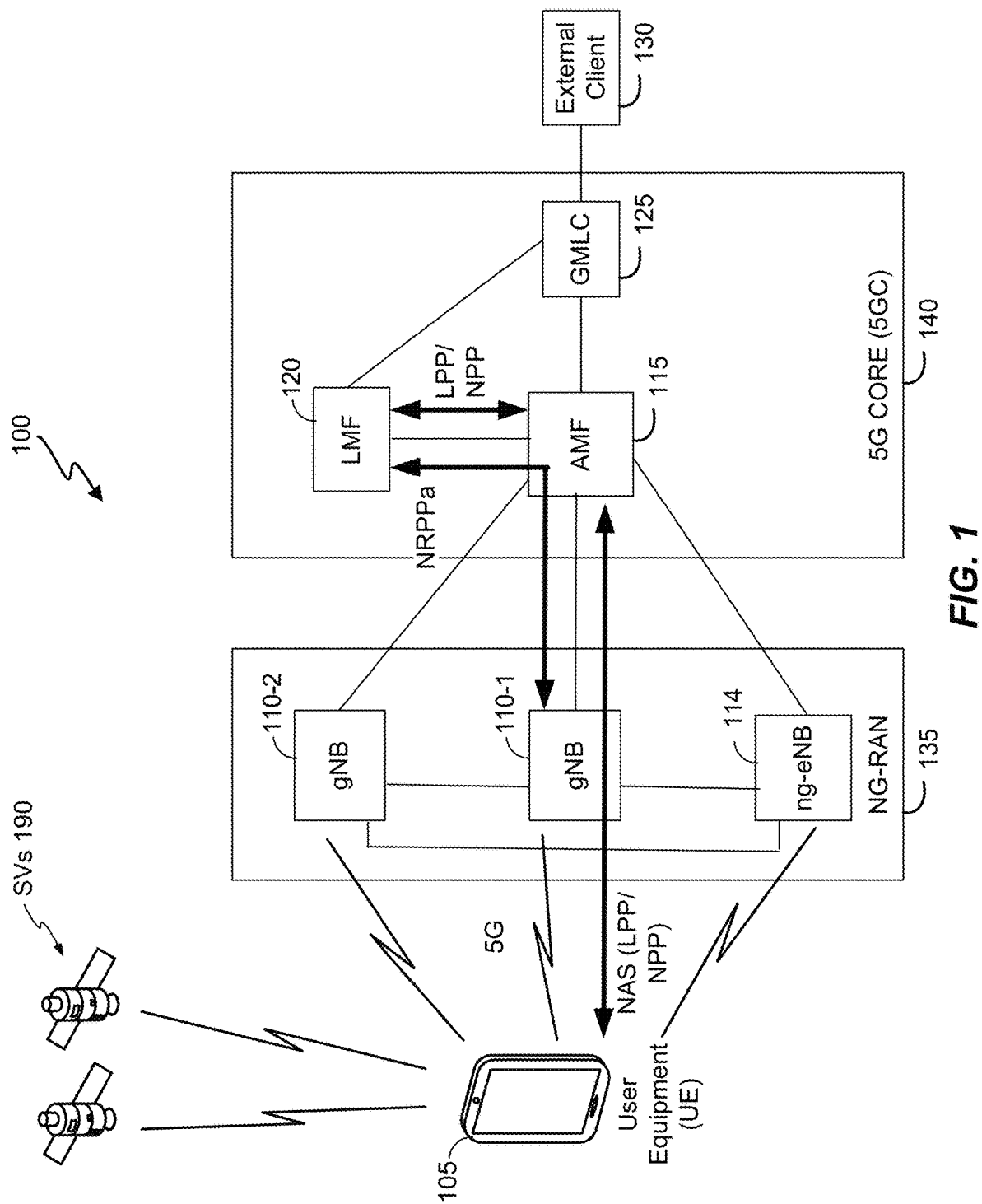
FIG. 1 is a diagram of an example communication system.

Like reference symbols in the various drawings indicate like elements, in accordance with certain example implementations. In addition, multiple instances of an element may be indicated by following a first number for the element with a hyphen and a second number or by a letter. For example, multiple instances of an element 110 may be indicated as 110-1, 110-2, 110-3 etc. and/or as 110*a*, 110*b*, 110*c* etc. When referring to such an element using only the first number, any instance of the element is to be understood (e.g. elements 110 in the previous example would refer to elements 110-1, 110-2 and 110-3 and/or to 110*a*, 110*b* and 110*c*).

DETAILED DESCRIPTION

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine signal strengths, times of arrival, time differences of arrival and/or receive time-transmit time differences. Combining these measurements with known locations for the base stations and possibly known transmission times from each base station may enable location of the mobile device using such position methods as Observed Time Difference Of Arrival (OTDOA) or Enhanced Cell ID (ECID). Such terrestrial based position methods may be employed in wireless networks that support different wireless technologies such as Long Term Evolution (LTE) and Fifth Generation (5G) (also referred to as New Radio (NR)) as defined by an organization known as the Third Generation Partnership Project (3GPP).

Described herein are systems, devices, methods, media and other implementations for directional positioning reference signals (PRS), also referred to as PRS beamforming. PRS signals are used to support positioning using, for example, the OTDOA position method, and may be transmitted for different cells in a network at the same set of times or at different sets of times. For example, in the case of LTE access, a PRS may be transmitted during PRS positioning occasions which may occur at fixed periodic intervals, with each positioning occasion comprising one or more consecutive subframes (e.g., LTE subframes of 1 ms duration each). Cells using the same carrier frequency may be synchronized and use PRS positioning occasions that occur at the same set of times. Although this would normally create interference in the case of other signals, a PRS for any cell can be made non-interfering with (e.g. orthogonal to) the PRS for any other nearby cell. This can be achieved using: (i) a different sequence of frequency subcarriers across consecutive OFDM symbols in an LTE subframe (referred to as a frequency shift or vshift), (ii) a different PRS code sequence, (iii) a different muting sequence in which PRS positioning occasions are muted according to a different periodic muting pattern, and/or (iv) different transmission times (e.g. which may be a variant of (iii)).

In the case of LTE or 5G communication technologies, a PRS may also be made non-interfering with (e.g. orthogonal to) another PRS by beamforming, using, for example, an antenna array at a base station (e.g. an eNodeB for LTE or a gNB for 5G). With beamforming, a signal (e.g., a PRS) is broadcast over a narrow continuous range of horizontal and/or vertical directions, e.g., directions with a horizontal span of 5 or 10 degrees (or smaller or larger). Transmitting different signals over a small angular range within a cell may also be referred to as spatial multiplexing. Similar to other approaches used to inhibit or prevent interference of PRS from different cells, a first directional (beamformed) PRS can be made non-interfering with any other second directional PRS transmitted from the same base station by ensuring that the directions in which the first directional PRS is transmitted are all different to the directions in which the second directional PRS is transmitted. When this non-interfering condition is achieved, the direction of transmission for the first directional PRS may be considered as, and may be referred to as being, unique (in the context of transmission from the given base station). In practice, achieving perfect non-interference may be difficult or impossible due to the existence of side lobes and back lobes. Hence, a first directional PRS may be considered to be, and may be referred to as being, transmitted in a unique direction when the signal strength for any second directional PRS transmitted by the same base station is substantially weaker in this particular unique direction (e.g. weaker by at least 10 decibels (dB)).

A directional PRS may have other signal characteristics, in addition to a unique direction of transmission, which allow it to be distinguished from another directional PRS and other non-directional PRS (e.g. transmitted throughout a cell coverage area). These other signal characteristics may include a particular carrier frequency, a particular frequency shift (or vshift), a particular PRS code sequence, a particular muting sequence, a particular bandwidth, and/or a particular set of transmission times. One of more of these signal characteristics may be different to the corresponding signal characteristics for other directional PRS and/or other non-directional PRS transmitted by the same base station and/or by other nearby base stations. When a particular first signal characteristic for a first directional PRS differs from a corresponding second signal characteristic for any other second directional PRS transmitted from the same base station and/or from other nearby base stations, the first signal characteristic may be considered as, and may be referred to as being, unique. When a particular first combination of two or more different signal characteristics for a first directional PRS differ from a second combination of two or more corresponding signal characteristics for any other second directional PRS transmitted from the same base station and/or from other nearby base stations, the first combination of two or more signal characteristics may be considered as, and may be referred to as being, unique.

A unique signal characteristic or a unique combination of signal characteristics may enable a directional PRS to be identified by both a mobile device and a location-capable device such as a location server. For example, a directional PRS may be defined according to its signal characteristics which may include a particular unique signal characteristic or a particular unique combination of signal characteristics and may further be assigned an identifier (ID) such a PRS ID, a transmission point (TP) ID or physical cell ID (PCI). Such an identifier may also be used to identify a non-directional PRS that is broadcast throughout a cell, which may avoid the need to define and implement different types of identifiers for directional PRS and non-directional PRS. By detecting and measuring a directional PRS that has a given unique signal characteristic or a given unique combination of signal characteristics and a unique identifier, a UE can be both aware of which directional PRS has been measured and can identify the directional PRS to a location-capable device such as a location server using the unique identifier (e.g. when any measurement for the directional PRS is provided by the UE to the location-capable device).

The implementations described herein include a method, at a first base station or other processor-based wireless node, for supporting positioning of a mobile device (e.g. a UE), with the method including generating a plurality of directional PRSs for at least one cell for the first base station, with each of the plurality of directional PRSs comprising at least one signal characteristic and a direction of transmission, and transmitting the each of the plurality of directional PRSs within the at least one cell, with each of the plurality of directional PRSs being transmitted in the direction of transmission. The at least one signal characteristic for a particular directional PRS may be indicative of the respective direction of transmission for that particular directional PRS. The direction of transmission for the particular directional PRS may be a unique or distinctive direction from a continuous range of horizontal angles, a continuous range of vertical angles, or a combination thereof. In some embodiments, the at least one signal characteristic may include one or more of, for example, a frequency shift, a PRS code sequence, a muting pattern, and/or a transmission time. In some embodiments, transmitting the plurality of directional PRSs within the at least one cell may include directing the plurality of directional PRSs through a controllable antenna array configured to beamform each directional PRS in the direction of transmission. At least one of the plurality of directional PRSs may be detectable by the mobile device to facilitate location determination of the mobile device at a location-capable device (which may be one or more of the first base station, another base station, the mobile device, or a Location Management Function (LMF)) based on an observed time difference of arrival (OTDOA) position method, an angle of departure (AOD) position method, or an Enhanced Cell ID (ECID) position method, or any combination thereof.

Also described herein are systems, devices, methods, media, and other implementations to facilitate positioning of a mobile device, including a method comprising receiving, at the mobile device, a first directional PRS transmitted by a first base station within at least one cell for the first base station, with the first directional PRS comprising at least one signal characteristic and a direction of transmission, and obtaining at least one first measurement for the first directional PRS based, at least in part, on the at least one signal characteristic. The method further includes facilitating location determination of the mobile device at a location-capable device based, at least in part, on the at least one first measurement. Also disclosed are methods, systems, media, devices, and other implementations, including a method, at a location-capable device, for supporting positioning of a mobile device, with the method including obtaining at least one first measurement from the mobile device for a first directional PRS transmitted by a first base station in at least one cell for the first base station, where the first directional PRS comprises at least one signal characteristic and a direction of transmission. The method further includes determining the location of the mobile device based, at least in part, on the at least one first measurement and the direction of transmission. The location-capable device may include one or more of, the first base station, another base station, the mobile device, and/or a location server (such as an LMF).

FIG. 1 shows a diagram of a communication system 100, according to an embodiment. The communication system 100 may be configured to implement directional PRS transmission and reception. Here, the communication system 100 comprises a user equipment (UE) 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It is noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology or for other communication technologies and protocols) may be used to transmit (or broadcast) directional PRSs from base stations (e.g. gNBs 110, ng-eNBs 114), receive and measure directional PRSs at UEs (e.g. UE 105) and compute a location for a UE 105 at a location-capable device such as the UE 105, a gNB 110 or LMF 120 based on measurements at the UE 105 for directional PRSs.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 include NR Node Bs, also referred to as gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communications access to the 5GC on behalf of the UE 105 using 5G. In FIG. 1, the serving gNB for UE 105 is assumed to be gNB 110-1, although other gNBs (e.g. gNB 110-2) may act as a serving gNB if UE 105 moves to another location or may act as a secondary gNB to provide additional throughout and bandwidth to UE 105.

Base stations (BSs) in the NG-RAN 135 shown in FIG. 1 may also include a next generation evolved Node B, also referred to as an ng-eNB, 114. Ng-eNB 114 may be connected to one or more gNBs 110 in NG-RAN 135—e.g. directly as shown in FIG. 1 or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of UE 105 positioning using directional PRS may be applicable to such other networks—e.g. for directional PRS transmission from an eNB and/or from a WiFi IEEE 802.11 access point (AP).

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), and/or other position methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/system that implements the LMF 120 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by 5GC 140 in some implementations.

As further illustrated in FIG. 1, the LMF 120 may communicate with the gNBs 110 and/or ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNBs 114, such as parameters defining directional PRS transmission from gNBs 110 and/or ng-eNB 114.

With a UE assisted position method, UE 105 may obtain location measurements and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for gNBs 110, ng-eNB 114 and/or a WLAN AP. The location measurements may also or instead include measurements of GNSS pseudorange, code phase and/or carrier phase for SVs 190. With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or Time Of Arrival (TOA) for signals transmitted by UE 105) and/or may receive measurements obtained by UE 105, and may send the measurements to a location server (e.g. LMF 120) for computation of a location estimate for UE 105.

Information provided by the gNBs 110 and/or ng-eNB 114 to the LMF 120 using NRPPa may include timing and configuration information for directional PRS transmission and location coordinates. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, and/or OTDOA (or some other position method). In the case of OTDOA, the LPP or NPP message may instruct the UE 105 to obtain one or more measurements (e.g. RSTD measurements) of PRS signals and/or directional PRS signals transmitted within particular cells supported by particular gNBs 110 and/or the ng-eNB 114 (or supported by some other type of base station such as an eNB or WiFi AP). The UE 105 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, positioning of a UE 105 using directional PRSs may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

As noted, in some embodiments, positioning functionality may be implemented, at least in part, using PRS transmissions and/or directional PRS transmissions, sent by base stations (such as the gNBs 110 and/or ng-eNB 114) that are within range of the UE whose position is to be determined (e.g., the UE 105 of FIG. 1). The UE may, in some instances, use the difference in the arrival times of downlink radio signals (e.g., directional PRS transmissions) from a plurality of base stations (such as gNBs 110, ng-eNB 114, etc.) to compute the UE's position. For example, if a signal from one base station is received at a time $t_1$, and a signal from another base station is received at a time $t_2$, then the OTDOA or RSTD may be computed according to $t_2-t_1$.

Figure 2:
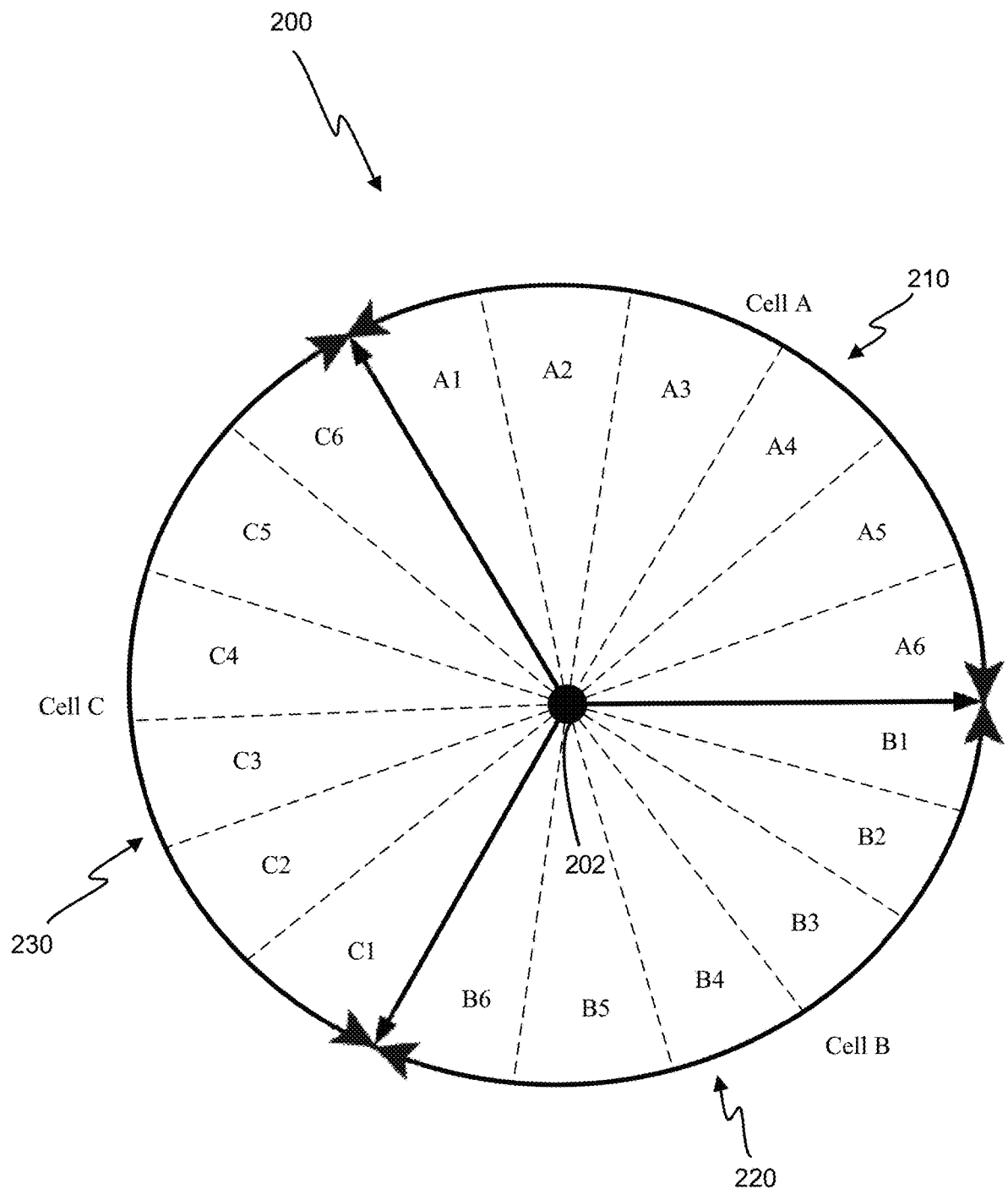
FIG. 2 is a diagram of an example configuration of beamformed (directional) positioning reference signals (PRS) transmitted from a base station.

FIG. 2 illustrates an example configuration 200 of directional PRS transmission (or PRS beamforming) at a base station 202 (represented by the small solid circle) that supports three (3) cell sectors A (marked as sector 210), B (marked as sector 220), and C (marked as sector 230). The base station 202 may be similar to or the same as any of gNBs 110 or ng-eNB 114 in FIG. 1, or may be some other base station (e.g., an eNB) or WiFi AP. Each cell sector (also referred to herein as cell) has a coverage area that, in the example illustration of FIG. 2, is a circle sector with a central angle of 120 degrees. In the example of FIG. 2, within each cell sector, six (6) separate directional PRS signals may be broadcast over (approximately) non-overlapping circle sectors with central angles of 20 degrees each. Other sector configurations and apportionment for directional PRS signals, with beamwidth and beam shape characteristics that may be controlled based on the antenna configuration implemented for the base station 202, may be realized. The separate directional PRS signals in FIG. 2 are labelled An, Bn and Cn where, in this example, 1≤n>6. In order to distinguish the separate directional PRS signals An, Bn and Cn (e.g., so that a UE and/or a location server can determine which directional PRS signal a UE is measuring) and/or to reduce interference, the directional PRS signals can be made orthogonal in various ways as described previously, e.g., by assigning each directional PRS a different (or unique) vshift value, a different (or unique) PRS code sequence, a different (or unique) muting pattern, a different (or unique) set of transmission times, or a different (or unique) combination of two or more of these signal characteristics.

The directional PRSs shown in FIG. 2 each span a continuous range of horizontal angles (or horizontal directions) within each circle sector that have a coverage of 20 degrees in a horizontal plane. Each directional PRS shown in FIG. 2 may also span a continuous but limited range of vertical angles (or vertical directions), such as angles that are angles of elevation ranging from zero degrees (which may coincide with a horizontal direction) to 20 degrees (which may coincide with a direction elevated at 20 degrees to the horizontal). Further, there may be other directional PRS signals, not shown in FIG. 2, that may share the same ranges of horizontal angles shown in FIG. 2 but may have different ranges of vertical angles. As an example, for each directional PRS shown in FIG. 2, there may be one directional PRS (shown in FIG. 2) with angles of elevation between zero and 20 degrees, another directional PRS (not shown in FIG. 2) with angles of elevation between 20 and 40 degrees and a third directional PRS (not shown in FIG. 2) with angles of elevation between 40 and 60 degrees, where each of these directional PRSs has the same range of horizontal angles. In another example, directional PRS signals may not be directional horizontally (e.g. may be transmitted throughout the coverage area of a particular cell) but may have different ranges of vertical angles. Control of directional PRS signals transmitted by an antenna array for base station 202 may be done by, for example, selecting individual antennas (or individual antenna elements) of the base station's 202 antenna array to transmit signals, controlling relative phases and amplitudes of signals directed through the various selected antennas (or antenna elements) of the array, etc.

One convenient way to treat directional PRS signals Pn in any cell sector P (e.g., where P represents in FIG. 2 one of A, B or C) may be to treat each directional PRS signal as corresponding to a different transmitter or different cell, e.g., as if each directional PRS signal Pn is transmitted by a different antenna such as an antenna associated with a distinct remote radio head for the cell sector P. A directional PRS signal Pn could then be assigned a distinct PRS ID associated with a distinct PRS code sequence and/or a distinct vshift for the directional PRS signal Pn. In some embodiments, a directional PRS signal could be assigned a distinct transmission point ID. For LTE access by a UE 105, this would allow a location server (e.g. an E-SMLC, SUPL SLP or LMF such as LMF 120) to provide assistance data to the UE 105 for the directional PRS signals Pn using existing capability in LPP. The assistance data can make a UE 105 aware of the existence of the directional PRS signals and the signal characteristics and other parameters for each directional PRS signal (e.g., a PRS ID, transmission point ID, carrier frequency, bandwidth, position occasion periodicity and number of subframes, muting pattern, expected RSTD measurement, etc.) and allow the UE 105 to make RSTD measurements for OTDOA positioning. This support may not require any changes to LPP (or NPP) since the location server could treat each directional PRS Pn the same as a PRS transmitted by a distinct radio head or distinct Distributed Antenna System (DAS) antenna for the cell sector P (as already supported in LPP).

In some embodiments, two or more different directional PRS signals Pn may be transmitted at the same time by base station 202 but in a manner that allows any one PRS signal Pi to be distinguished from any other PRS signal Pj by a UE 105 (e.g., by using a different frequency, different frequency shift or different PRS code sequence). In another embodiment, one PRS signal may be transmitted by base station 202 in a cell (e.g. cell A, B or C) in different directions at different non-overlapping times, using beamforming. For example, the base station 202 for the cell sector A in FIG. 2 may transmit a directional PRS signal using beamforming in a direction coinciding with directional PRS A1 for a time interval T1, may then change the direction of PRS signal transmission to coincide with directional PRS A2 for a time interval T2, and may subsequently change the direction of directional PRS signal transmission to coincide with directional PRS signals A3, A4, A5 and A6 for time intervals T3, T4, T5 and T6, respectively. If the time intervals T1, T2, . . . T6 are substantially non-overlapping, there may be no ambiguity regarding which directional PRS signal a UE 105 has measured if the time interval during which the directional PRS signal is measured can be obtained and compared with the known transmission intervals T1, T2, . . . Tn. Moreover, the order in which the angle of directional PRS transmission is changed in a cell may be varied, e.g., with the angle (of transmission, relative to some reference point or reference line) changed to correspond to any permutation of the different PRS signals A1, A2, . . . A6. For example, in one embodiment, the base station 202 may change the angle of directional PRS transmission in a cyclic manner (e.g. by transmitting directional PRS signals in the order A1, A2, . . . A6 or in the reverse order) and/or may rotate directional PRS transmission in a circle (e.g. by transmitting directional PRS signals in the order A1, A2, . . . A6, followed by B1, B2, . . . B6 and then by C1, C2, . . . C6). A UE 105 that measures a PRS signal for the cell sector A may determine the time of measurement using timing information included as party of the directional PRS signal or timing information sent separately using another signal transmitted for the cell sector A (e.g. an omnidirectional cell-specific reference signal), or by obtaining the time using timing provided by a different cell S such as the cell sector B or cell sector C in FIG. 2 or a serving cell for the UE 105 if different to cell sectors A, B and C. In the latter case, if the timing difference between cells A and S is known (e.g. due to synchronizing transmission timing of cells A and S using GPS or GNSS or determining the transmission timing of cells A and S relative to GPS or GNSS), the measurement time for a directional PRS signal relative to cell S can be used to determine the measurement time relative to the cell sector A, and thus which directional PRS signal was measured.

There are several ways in which directional PRS signals may be utilized for location determination (e.g., to perform OTDOA positioning) for a UE 105. In a first example, directional PRS signals may be used to obtain direct information on the location of a UE 105. For example, if a UE 105 is able to receive and measure directional PRS A5 in FIG. 2, the UE 105 is determined to be within the coverage area of directional PRS A5, and not somewhere else in the coverage area of cell sector A. This may be used to improve the accuracy of UE location.

Figure 3A:
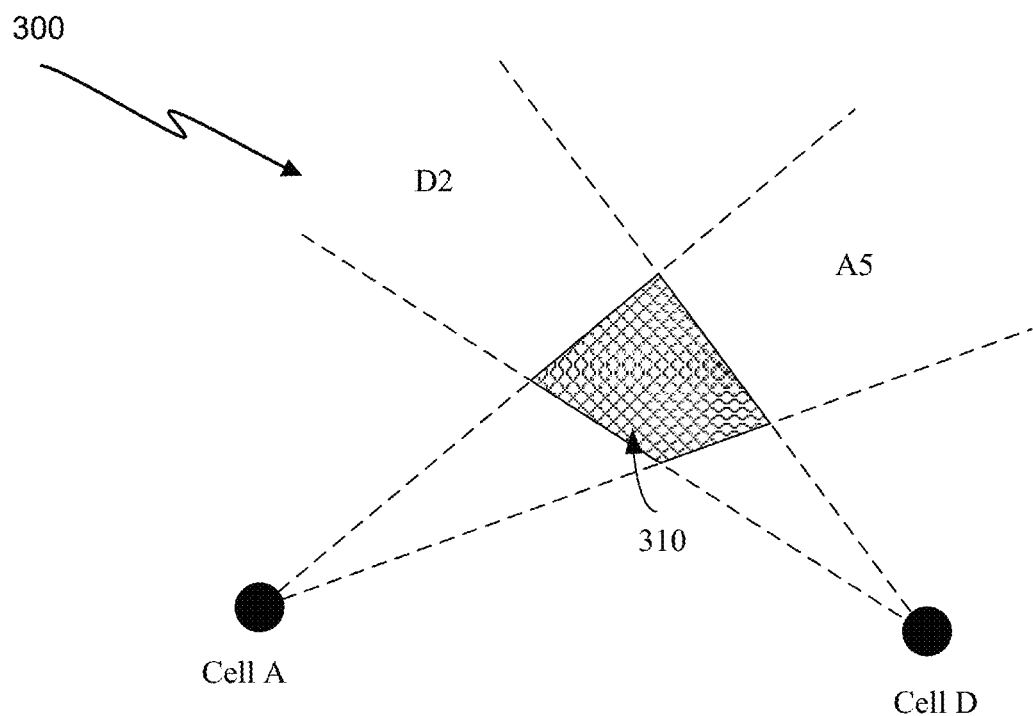
FIG. 3A is a diagram illustrating an example implementation of using directional (beamformed) PRS signals for location determination functionality.

FIG. 3A shows a diagram 300 illustrating the use of directional (beamformed) PRS signals for location determination functionality. In this example, a UE 105 (not shown) measures or detects, for example, the directional PRS signal marked as PRS A5 in FIG. 2. The UE 105 may also measure/detect another directional PRS signal, namely, the directional PRS D2, transmitted from another cell D with a different antenna location to cell sector A. For example, cell D may be supported by a gNB 110 (or ng-eNB 114) in FIG. 1, which may be different to a gNB 110 that supports cell sector A. The UE 105 can then be inferred to be within the intersection region 310 of the two directional PRS beams as shown in FIG. 3A. The example in FIG. 3A may be referred to as positioning based on an angle of departure (AOD) position method.

The location determination according to FIG. 3A may be performed at a location-capable device that knows the locations of the base station antennas for cells A and D and the precise directions of the directional PRSs A5 and D2. For example, the location-capable device may be the base station for cell A, the base station for cell D, the LMF 120 or the UE 105 (e.g. if the UE 105 is provided with the locations of the base station antennas for cells A and D and the precise directions of the directional PRSs by another entity such as a serving base station or the LMF 120).

Figure 3B:
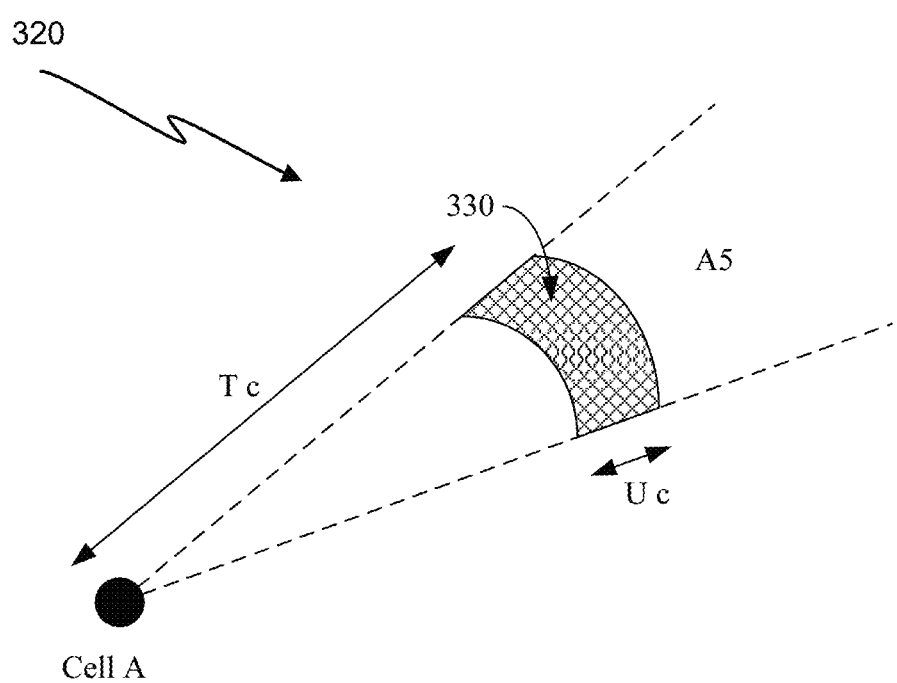
FIG. 3B is a diagram illustrating another example implementation of using directional PRS signals to facilitate location determination functionality.

FIG. 3B includes a diagram 320 showing another example implementation of using directional PRS signals to facilitate location determination functionality. In the example of FIG. 3B a UE 105 (not shown) measures/detects the PRS A5 of FIG. 2. Here the UE 105 and/or the gNB 110 for cell A (or some other wireless node such as ng-eNB 114) measures the signal propagation time or round trip signal propagation time (RTT) between the UE 105 and the antenna for cell A. If the RTT has a measured value of 2T plus or minus an uncertainty of U, the distance between the UE and the antenna for cell A would be given by (T c) with an uncertainty of (U c) where c is the speed of light, and assuming line of sight (LOS) transmission. In this example, a determination may be made, based on the identity of the particular directional PRS detected by the UE 105, and the measured timing information (e.g., RTT), that the UE 105 is located in a region 330 depicted in FIG. 3B. The example in FIG. 3B may be referred to as positioning based on Enhanced Cell ID (ECID).

The location determination according to FIG. 3B may be performed at a location-capable device that knows the location of the base station antenna for cell A, the precise direction of the directional PRS A5 and the measured RTT and its uncertainty. For example, the location-capable device may be the base station for cell A, the LMF 120 or the UE 105 (e.g. if the UE 105 is provided with the location of the base station antenna for cell A, the precise direction of the directional PRS A5 and optionally information to assist RTT determination, by another entity such as the base station for cell A).

In a further example implementation, directional (beamformed) PRS may be used to mitigate error/inaccurate positioning due to measurement of multipath signals. With multipath, a signal transmitted in a cell may undergo reflection, refraction and/or scattering from one or more surfaces, objects (e.g., walls and roofs of buildings) or materials (e.g. water, air) so that the signal received by a UE may not be a line of sight (LOS) signal, but rather some redirection of a signal transmitted from a source that may or may not be in the UE's LOS. This will normally increase the signal propagation time to a UE compared to any LOS signal leading to errors in time-based position methods such as OTDOA.

Figure 4:
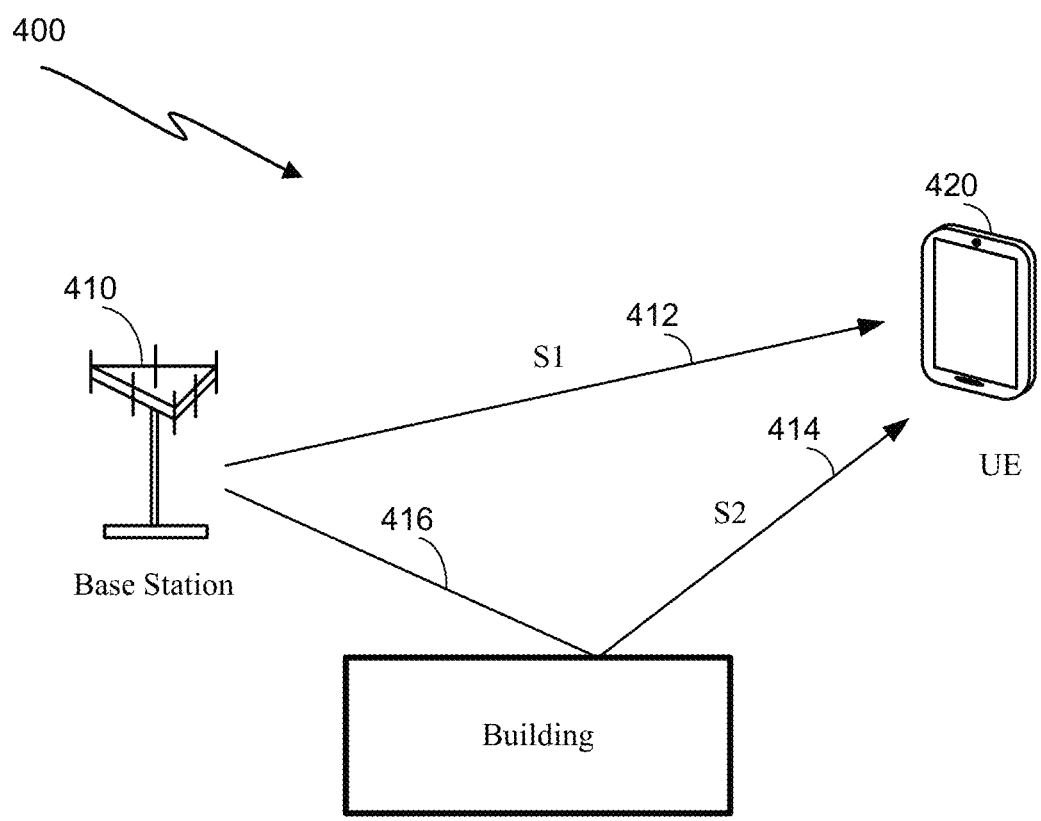
FIG. 4 is a diagram illustrating mitigation of multipath effects using a directional PRS signal.

FIG. 4 includes a diagram 400 illustrating two signals, namely, 51 (marked as a signal 412) and S2 (marked as a signal 414), reaching a UE 420 in a cell supported by a base station 410. The UE 420 may be similar to or the same as the UE 105 of FIG. 1. The base station 410 may be similar to or the same as any of the gNBs 110 or ng-eNB 114 of FIG. 1, or to some other base station, such as an eNB supporting LTE communication, or some other node or access point. In the example depicted in FIG. 4, the signal S1 is a LOS signal directly received from the base station 410, while the signal S2 is a multipath signal, also referred to as a non-LOS (NLOS) signal, resulting from reflection of a signal 416 that originated from the base station 410. Since the multipath (NLOS) signal S2 does not travel to the UE entirely along a straight line, it would typically initially travel from the cell antenna in a different direction to the signal S1, as shown in FIG. 4. Thus, if the cell is using directional PRSs, signals S1 and S2 would typically correspond to different directional PRS signals (e.g., if the beam angles are narrow enough). For example, if the cell served by the base station 410 corresponds to the cell A of FIG. 2, and if signal S1 corresponds to the directional PRS signal A3, signal S2 might correspond to another directional PRS such as A2 or A4. A location server (or the UE 420) that knows the approximate location of the UE 420 could therefore direct the UE 420 to measure signal S1 (e.g., directional PRS A3 in FIG. 2) but not direct the UE 420 to measure signal S2 (e.g., directional PRS A2 or A4 in FIG. 2) by providing assistance data only for signal S1. This would prevent or inhibit the UE 420 from measuring a multipath signal and improve the chance of measuring a LOS signal. Because different directional PRS signals may be associated, in some embodiments, with different (or unique) signal characteristics (e.g., different PRS IDs, different frequency shifts (vshift), different PRS code sequences, different muting patterns, different transmission times, etc.), the UE 420 may thus be configured to measure a directional PRS signal associated with some particular signal characteristic value (e.g., a particular PRS code sequence or a particular vshift value) or some particular combination of signal characteristic values (e.g. a particular PRS code sequence value and a particular vshift value) that is/are associated with an expected LOS directional PRS signal (such as signal S1 412 in FIG. 4 or signal A3 in FIG. 2). However, UE 420 may not be configured to measure (or may be configured to not measure) a directional PRS signal that is not expected to be LOS (e.g. directional PRS A2 or A4 in FIG. 2) that is associated with some other signal characteristic value or some other combination of signal characteristic values.

In another aspect, UE 105 may have multiple antennas (e.g. an antenna array) that allow UE 105 to selectively receive and measure signals that arrive from certain directions and to filter out and ignore signals that arrive from other directions. A location server (e.g. LMF 120) may provide UE 105 with the direction of transmission for the LOS signal S1 412 but may not provide information for the NLOS signal S2 414/416. UE 105 may then use the multiple antennas (e.g. antenna array) to receive and measure signals with the same direction of transmission as signal S1 which may enable UE 105 to measure a TOA or RSTD (or other signal characteristic) for signal S1. The use of multiple antennas or an antenna array at UE 105 to tune reception to a particular direction of transmission may reduce interference to signal S1 from other signals (such as signal S2) and may enable improved acquisition of signal S1 by UE 105 and higher measurement accuracy.

Directional (beamformed) PRS signals may also be used to mitigate multipath effects in situations where a location server (or UE 420) may not have the approximate location of the UE 420, or does not provide information to the UE 420 for only LOS signals. In this case, a location server (or the UE 420) may receive (or obtain) some measurements (e.g. OTDOA RSTD measurements) from the UE 420 for multipath signals (such as the signal S2 414 in FIG. 4) as well as measurements (e.g. OTDOA RSTD measurements) for LOS signals (such as the signal S1 412 in FIG. 4). The location server (or UE 420) may obtain an initial position for the UE 420 using all of the measurements provided (or obtained) by the UE 420. The location server (or UE 420) can then identify directional PRS signals whose coverage areas do not include the determined location and tentatively identify these signals as multipath signals. The location server (or UE 420) can then re-determine the UE 420 location using only measurements for signals not identified as multipath signals. The process may be iterated by again identifying directional PRS signals whose coverage areas do not include the new location and treating these as multipath signals. Directional PRS signals initially tentatively identified as multipath signals may no longer need to be identified as multipath signals if the new UE 420 location is now within their coverage areas. Variants of this example procedure can also be used in situations in which the location determination procedure uses directional information as well as RSTD measurements to determine the initial (and any subsequent) UE 420 location.

In another aspect, UE 420 may measure an angle of arrival (AOA) for a directional PRS as well as other characteristics such as a TOA and/or RSTD. If the UE 420 measured AOA is consistent with (e.g. is equal to or approximately equal to) the direction of transmission for the measured directional PRS, the UE 420 or a location-capable device such as an E-SMLC or LMF 120 may assume that the directional PRS measured by UE 420 is LOS (e.g. such as being signal S1 412 in FIG. 4). Conversely, if the UE 420 measured AOA is not consistent with (e.g. is not equal to and not approximately equal to) the direction of transmission for the measured directional PRS, the UE 420 or a location-capable device such as an E-SMLC or LMF 120 may assume that the directional PRS measured by UE 420 is NLOS or multipath (e.g. such as being signal S2 414/416 in FIG. 4).

The above example embodiments, discussed (in part) in references to FIGS. 3A, 3B, and 4, can be used to improve location determination for a UE 105 for UE assisted OTDOA, when, for example, the UE 105 provides measurements of directional PRSs to a location-capable device such as a gNB 110, ng-eNB 114 or LMF 120 for determination of the location of UE 105. The embodiments can also be used to improve location determination for UE based OTDOA for UE 105 when, for example, the network (e.g. a gNB 110 or ng-eNB 114) or a location server (e.g. the LMF 120) provides the UE 105 with information on directional PRSs (e.g. directional PRS transmission directions and signal characteristics) as well as base station coordinates and other PRS parameters. For example, for either UE assisted OTDOA or UE based OTDOA, a gNB 110 or an ng-eNB 114 in the communication system 100 of FIG. 1 could broadcast information for directional PRSs transmitted by this gNB 110 or ng-eNB 114 and possibly directional PRSs transmitted by other nearby gNBs 110 and/or ng-eNBs 114.

Figure 5:
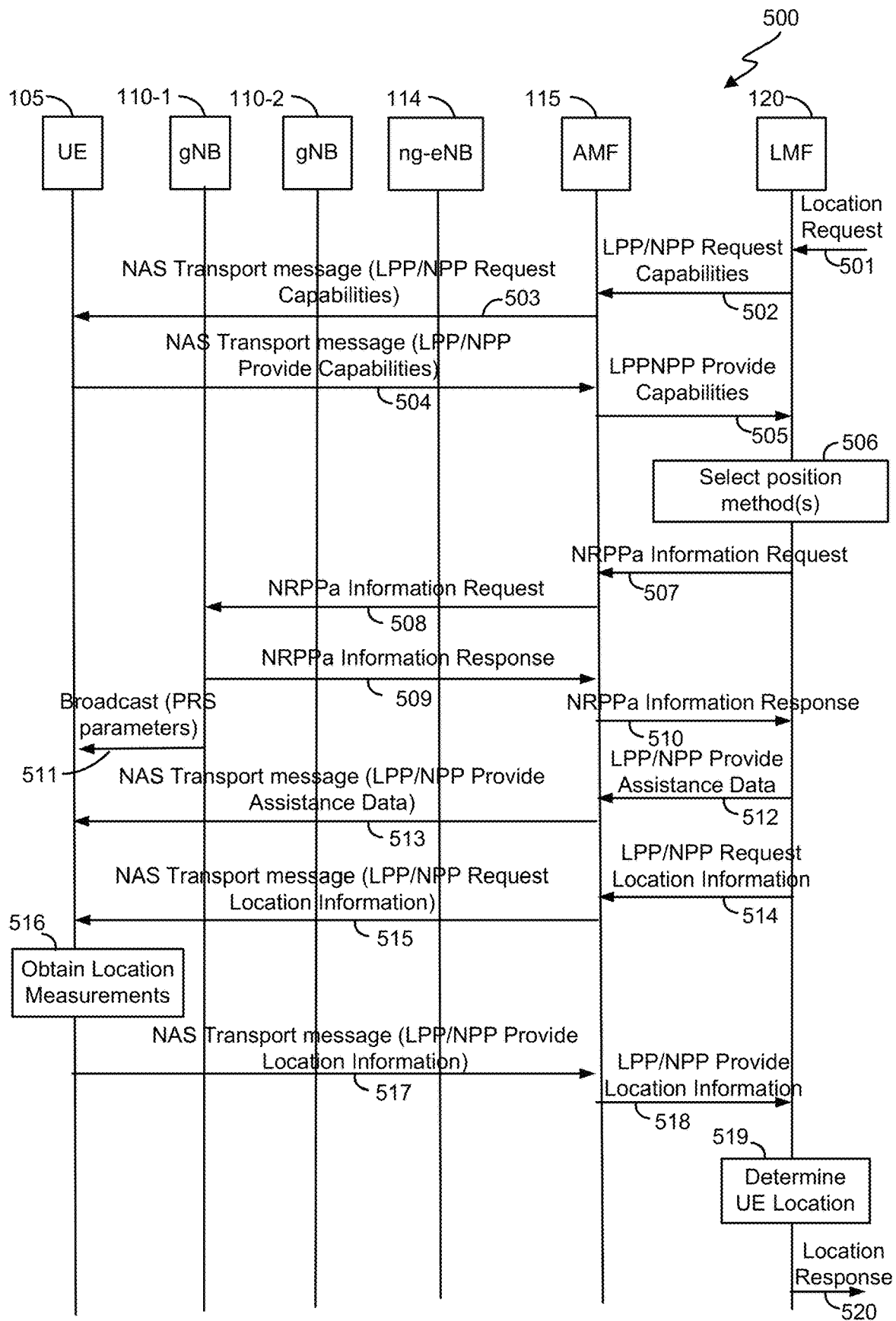
FIG. 5 is a signaling flow diagram showing messages sent between components of a communication network during a location session.

FIG. 5, and with further reference to FIG. 1, shows a signaling flow 500 that illustrates the various messages sent between components of a communication network, such as the communication system 100 depicted in FIG. 1, during a location session using LPP and/or NPP (also referred to as an LPP/NPP session) between the UE 105 and a location server corresponding to the LMF 120. While the signaling flow 500 is discussed, for ease of illustration, in relation to a 5G communication network implementation, similar messaging may be realized for other communication technologies or protocols (such as EPS or WLAN). Furthermore, in some embodiments, the UE 105 itself may be configured to determine its location using, for example, assistance data provided to it (e.g. by LMF 120 or by a serving gNB 110-1). The positioning protocol used for signaling flow 500 may be LPP, NPP or LPP combined with NPP (e.g. where an LPP message includes an embedded NPP message). Messages for the positioning protocol are accordingly referred to below as LPP/NPP messages to indicate that the messages are for LPP, NPP or LPP combined with NPP. However, other positioning protocols are also possible such as the LPP Extensions (LPPe) protocol defined by the Open Mobile Alliance (OMA).

In some embodiments, a location session for UE 105 can be triggered when the LMF 120 receives a location request for UE 105 at action 501. Depending on the scenario, the location request may come to the LMF 120 from the AMF 115 or from the GMLC 125 depicted in FIG. 1. The LMF 120 may then query the AMF 115 for information for the UE 105. The AMF 115 may then send information for the UE 105 to the LMF 120 (not shown in FIG. 5). The information may indicate that UE 105 has 5G (or LTE or eLTE) wireless access (for the example embodiments of FIG. 5), and may provide a current 5G serving cell for UE 105 (e.g. a cell supported by gNB 110-1 which may be a serving gNB for UE 105) and/or may indicate that the UE 105 supports location using LPP and/or NPP. Some or all of this information may have been obtained by the AMF 115 from UE 105 and/or from the gNB 110-1, e.g., when the UE 105 attaches to and registers with the 5GC 140.

To begin the LPP/NPP session (e.g., and based on an indication of UE 105 support for LPP and/or NPP with 5G wireless access), the LMF 120 sends an LPP/NPP Request Capabilities message at action 502 to the AMF 115 serving the UE 105 (e.g. using 5G LCS AP). The AMF 115 may include the LPP/NPP Request Capabilities message within a 5G NAS transport message, at action 503, which is sent to the UE 105 (e.g., via a NAS communication path in the NG-RAN 135, as illustrated in FIG. 1). The UE 105 responds to the AMF 115 with an LPP/NPP Provide Capabilities message at action 504, also within a 5G NAS transport message. The AMF 115 extracts the LPP/NPP Provide Capabilities message from the 5G NAS transport message and relays the LPP/NPP Provide Capabilities message to the LMF 120 (e.g., using 5G LCS AP) at action 505. Here, the LPP/NPP Provide Capabilities message sent at actions 504 and 505 may indicate the positioning capabilities of the UE 105, e.g., the position methods and associated assistance data supported by the UE 105 (such as A-GNSS positioning, OTDOA positioning, ECID positioning, WLAN positioning, etc.) while accessing a 5G network. In the case of some position methods (e.g. OTDOA positioning), the capabilities may indicate if the UE 105 is able to measure, or able to improve measurement for, directional PRS signals. For example, the capabilities may indicate that the UE 105 is able to tune PRS reception to a particular expected direction of arrival for a directional PRS using multiple antennas. However, in an aspect, a UE 105 may acquire and measure a directional PRS in the same way as a non-directional PRS (e.g. a PRS that is transmitted throughout an entire cell coverage area) and may not need to be aware of whether a PRS is a directional PRS or non-directional PRS. In this aspect, the capabilities may not indicate UE support for a directional PRS.

Based on the positioning capabilities of the UE 105 received at action 505 and possibly based on the location request received at action 501 (e.g. a location accuracy requirement included in the location request received at action 501), the LMF 120 may select one or more position methods to locate UE 105 at action 506. For example, the LMF may select OTDOA and/or ECID at action 506 in association with directional PRS transmitted from gNBs 110 and/or from ng-eNB 114.

Based on the position method(s) selected at action 506 and the assistance data indicated by the UE 105 as being supported at action 505, the LMF 120 may determine assistance data for the UE 105 to support the selected position method(s). LMF 120 may then send an NRPPa Information Request message at action 507, which may be relayed to the serving node gNB 110-1 by the AMF 115 (at action 508). The NRPPa Information Request may request location related information for gNB 110-1, such as the location of gNB 110-1, PRS configuration parameters for gNB 110-1 and/or information concerning broadcast of assistance data by the gNB 110-1. The NRPPa Information Request sent at actions 507 and 508 may include a request for configuration parameters related to directional PRSs (e.g. a request for a direction of transmission, a range of horizontal angles, a range of vertical angles and/or other signal characteristics for each directional PRS transmitted by gNB 110-1). The serving node gNB 110-1 responds with an NRPPa Information Response message, at action 509, which may be relayed to the LMF 120 by the AMF 115 at action 510. The NRPPa Information Response may provide some or all of the location related information requested at actions 507 and 508. For example, when configuration parameters for PRSs and/or directional PRSs are requested at actions 507 and 508, the NRPPa Information Response may provide signal characteristics and other configuration information for each PRS and/or each directional PRS supported by gNB 110-1. In the case of a directional PRS, the provided information may include a direction of transmission, a range of horizontal angles, a range of vertical angles and/or other signal characteristics (e.g. a carrier frequency, frequency shift (or vshift), bandwidth, code sequence, periodicity of positioning occasions, duration of a positioning occasion, and/or muting sequence). Actions 507-510 may be repeated by the LMF 120 to obtain location related information (e.g. configuration parameters for directional PRSs) from other gNB 110s and/or ng-eNBs nearby to UE 105, such as gNB 110-2 and ng-eNB 114 (not shown in FIG. 5).

In some implementations, serving gNB 110-1, and/or other gNBs 110 and ng-eNBs such as gNB 110-2 and ng-eNB 114 (not shown in FIG. 5) may broadcast assistance data to UE 105 (and to other UEs) at action 511 and/or may provide assistance data to UE 105 by point to point means, e.g. using a Radio Resource Control Protocol (RRC) for 5G access (not shown in FIG. 5). The broadcast may use System Information Blocks (SIBs) for an RRC protocol in some implementations. The assistance data may include configuration parameters and signal characteristics for PRS signals and/or directional PRS signals that are transmitted by the sending gNB 110 and/or that are transmitted by other nearby gNBs 110 and/or ng-eNB 114. The configuration parameters and signal characteristics for PRS signals and/or directional PRS signals broadcast by gNB 110-1 (and/or by other gNBs 110 and/or ng-eNB 114) may be the same as the configuration parameters and signal characteristics for PRS signals and/or directional PRS signals described further down for the location related information sent at actions 512 and 513. In some embodiments, actions 512 and 513, as described next, may not occur—e.g. if all location related information can be broadcast to UE by gNB 110-1 and/or by other gNBs 110 and/or ng-eNB 114.

The LMF 120 may send some or all of the assistance data received at action 510, and possibly other assistance data already known to the LMF 120, to the UE 105 via an LPP/NPP Provide Assistance Data message sent to the AMF 115 at action 512, and relayed to the UE 105 by the AMF 115 in a 5G NAS transport message at action 513. In the case of OTDOA positioning, the assistance data can include the identities of a reference cell and neighbor cells supported by gNBs 110 and/or by ng-eNB 114 and may include information for each cell, such as the cell carrier frequency, and configuration parameters for each PRS transmitted within the cell. The assistance data may also include configuration parameters and signal characteristics that are associated with different directional PRS signals that can be beamformed by the antenna arrays of gNBs 110 and/or ng-eNB 114. For example, in such embodiments, the assistance data may include, for each directional PRS transmitted by the reference cell or a neighbor cell, such information as a PRS ID, a transmission point ID, a physical cell ID, a code sequence, a muting pattern, a frequency shift (vshift), a periodicity and duration of positioning occasions etc. The information included in the assistance data sent at actions 512 and 513 for each directional PRS may be the same as information that can be included for a non-directional PRS, in which case the assistance data may not identify a directional PRS or provide any distinct assistance data. However, in an aspect, the assistance data sent by LMF 120 at actions 512 and 513 may include distinct information for a directional PRS, such as an identification of a directional PRS, a direction of transmission, a range of horizontal angles and/or a range of vertical angles. In some implementations, information for directional PRSs such as that just described may be sent by LMF 120 at actions 512 and 513 when the position method (s) selected at action 506 include(s) ECID, OTDOA, and/or other position methods (e.g. AOA, AOD, WLAN) that make use of directional PRS measurements by UE 105.

The NAS Transport message transmitted at the action 513 can be followed by an LPP/NPP Request Location Information message, again sent from the LMF 120 to AMF 115, at action 514, which is relayed to the UE 105 in a 5G NAS transport message by AMF 115 at action 515. The LPP/NPP Request Location Information message may request one or more location measurements from UE 105 and/or a location estimate according to, for example, the position method(s) selected at action 506 and/or the position capabilities of UE 105 sent to LMF 120 at actions 504 and 505. The positioning measurements may, for example, include TOA measurements for OTDOA or ECID, RSTD measurements for OTDOA, measurements of an AOA, RTT, RSRP, RSRQ and/or one way signal propagation delay for ECID, etc. Some of the positioning measurements may further be specified or allowed to be measured for directional PRSs—e.g. directional PRSs for which configuration parameters and signal characteristics may have been provided, as previously described for actions 511, 512 and 513.

At action 516, the UE 105 can subsequently obtain some or all of the location measurements (and other information) requested at actions 514 and 515. The location measurements may be made based, in part, on the directional PRSs transmitted by the serving gNB 110-1 and/or by other nearby gNBs 110 and/or ng-eNB 114. For example, for OTDOA, the directional PRSs may be transmitted by gNBs 110 and/or ng-eNB 114 within the reference cell and/or neighbor cells. The measurements obtained at action 516 may comprise some or all of the measurements requested at action 515 or implied at action 515 if action 515 requests a location estimate from UE 105. UE 105 may measure a directional PRS (e.g. for the reference cell or a neighbor cell in the case of OTDOA or for a serving cell or neighbor cell in the case of ECID) based on configuration parameters and signal characteristics provided for the directional PRS in the location related information received at action 511 and/or at action 513. For example, UE 105 may use one or more of a PRS ID, a transmission point ID, a physical cell ID, a code sequence, a muting pattern, a frequency shift (vshift), a periodicity and duration of positioning occasions for a directional PRS to acquire the directional PRS and measure characteristics such as a AOA, TOA, RSTD, RSSI, RSRP, RSRQ, RTT etc. In some aspects, UE 105 may also or instead use distinct (or unique) information for a directional PRS, if received at action 511 and/or at action 513, to acquire and measure the directional PRS. The distinct (or unique) information may include an identification of a directional PRS, a direction of transmission, a range of horizontal angles and/or a range of vertical angles. For example, as described in relation to FIG. 4, in some implementations, the UE 105 may selectively measure directional PRSs that are expected to be LOS and ignore directional PRSs that are expected to be not received or to be NLOS (or multipath). In addition, or instead, UE 105 may use multiple antennas or an antenna array to selectively receive and measure a directional PRS received for a particular direction of transmission and filter out and ignore any signals including directional PRSs received for other directions of transmission.

In some embodiments, at least some of the location measurements obtained at action 516 are provided in an LPP/NPP Provide Location Information message, which is sent from the UE 105 to the AMF 115 in a 5G NAS transport message at action 517. The AMF 115 extracts the LPP/NPP Provide Location Information message from the 5G NAS transport message, and relays it to the LMF 120 (e.g., using 5G LCS AP) at action 518. With this information, the LMF 120 can then determine the UE 105 location at action 519. The LMF 120 may employ one or more of the techniques described in association with FIGS. 3A, 3B and 4 to determine the location of UE 105. For example, when the location measurements returned by UE 105 at actions 517 and 518 include measurements for one or more directional PRSs (e.g. measurements of TOA, RSRP, RSRQ, RSTD, RTT), the LMF 120 may identify a directional PRS for which a measurement was provided using a PRS ID or TP ID (e.g. which may be associated with a particular code sequence and/or frequency shift (vshift)) or a time of measurement (e.g. TOA measurement) and may then use one or more of the techniques described for FIGS. 3A-4 such as ECID, AOA or OTDOA.

Following location determination at action 519, LMF 120 may send the determined location at action 520 to the entity (e.g. GMLC 125 or AMF 115) which sent the location request at action 501.

In some embodiments, UE 105 may determine a location for UE 105 following action 516 (not shown in FIG. 5). The location may be determined by UE 105 as just described for action 519 using techniques described in association with FIGS. 3A-4. The location determination by UE 105 may be based on location related information received by UE 105 at action 511 and/or at actions 512 and 513 including location related information described previously and other information such as the locations of antennas for gNBs 110 and/or ng-eNB 114 and any transmission timing differences for gNBs 110 and/or ng-eNB 114. UE 105 may then return the determined location to LMF 120 at actions 517 and 518 instead of returning location measurements. In this embodiment, action 519 may not occur.

Figure 6:
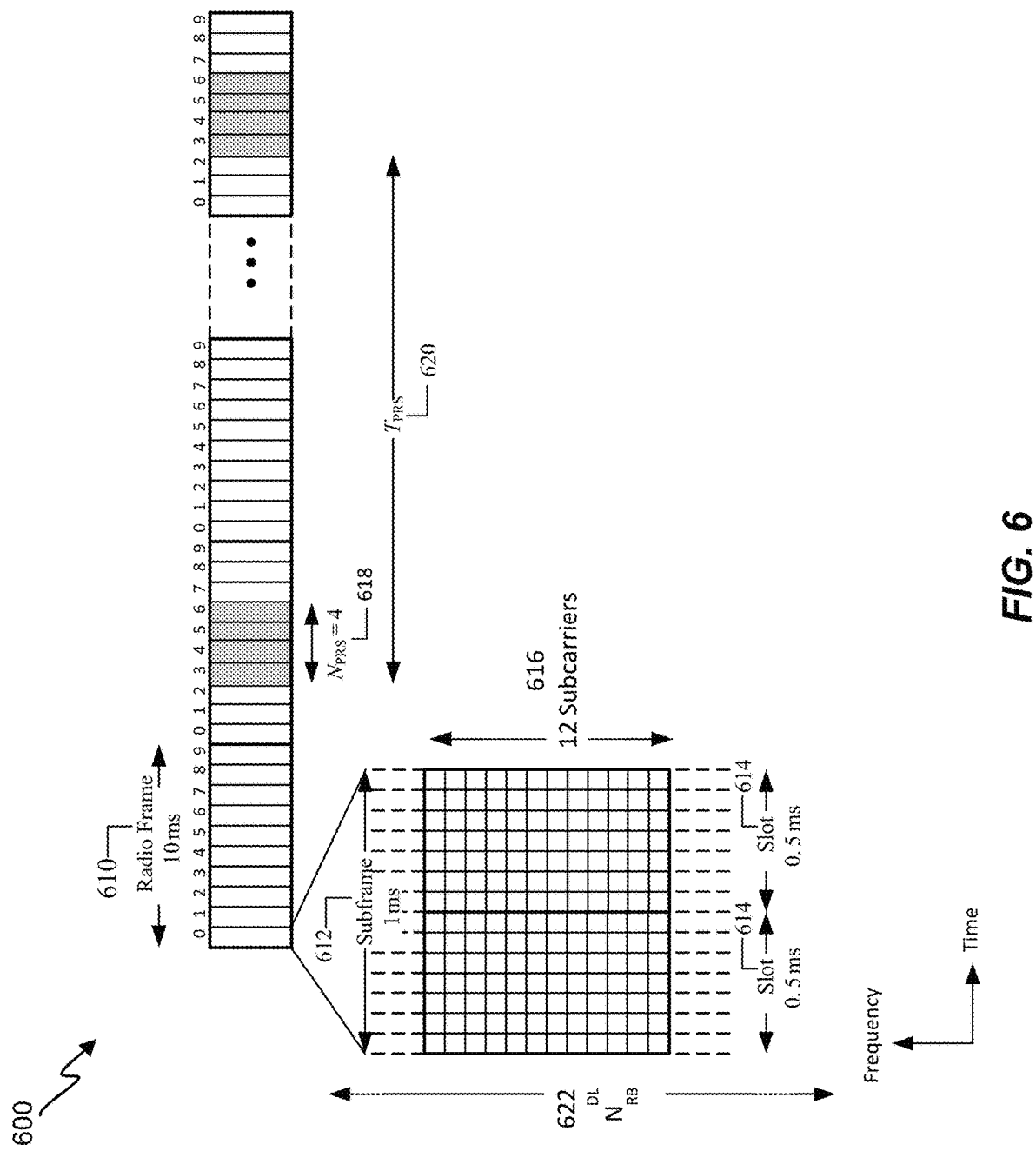
FIG. 6 is a diagram of a structure of an example LTE subframe sequence with PRS positioning occasions.

FIG. 6 shows a structure of an example LTE subframe sequence 600 with PRS positioning occasions. Subframe sequence 600 may be applicable to broadcast of PRS and directional PRS from ng-eNB 114 in communication system 100. While FIG. 6 provides an example of a subframe sequence for LTE, similar subframe sequence implementations may be realized for other communication technologies/protocols, such as 5G and NR. For example, a gNB 110 in communication system 100 may broadcast a PRS, a directional PRS or other type of reference signal (RS) or directional RS (e.g. a Tracking Reference Signal (TRS)) that is similar to subframe sequence 600. In FIG. 6, time is represented horizontally (e.g., on an X axis) with time increasing from left to right, while frequency is represented vertically (e.g., on a Y axis) with frequency increasing (or decreasing) from bottom to top. As shown in FIG. 6, downlink and uplink LTE Radio Frames 610 may be of 10 ms duration each. For downlink Frequency Division Duplex (FDD) mode, Radio Frames 610 are organized, in the illustrated embodiments, into ten subframes 612 of 1 ms duration each. Each subframe 612 comprises two slots 614, each of, for example, 0.5 ms duration.

In the frequency domain, the available bandwidth may be divided into uniformly spaced orthogonal subcarriers 616. For example, for a normal length cyclic prefix using, for example, 15 kHz spacing, subcarriers 616 may be grouped into a group of twelve (12) subcarriers. Each grouping, which comprises the 12 subcarriers 616, is termed a resource block and, in the example above, the number of subcarriers in the resource block may be written as $N_{SC}^{RB}=12$. For a given channel bandwidth, the number of available resource blocks on each channel 622, which is also called the transmission bandwidth configuration 622, is indicated as $N_{RB}^{DL}$. For example, for a 3 MHz channel bandwidth in the above example, the number of available resource blocks on each channel 622 is given by $N_{RB}^{DL}=15$.

In the communication system 100 illustrated in FIG. 1, an ng-eNB 114 or a gNB 110, such as either of the gNBs 110-1, or 110-2, may transmit frames, or other physical layer signaling sequences, supporting PRS signals (i.e. a downlink (DL) PRS) according to frame configurations either similar to, or (e.g. in the case of ng-eNB 114) the same as that, shown in FIG. 6 and (as described later) in FIG. 7, which may be measured and used for UE (e.g., UE 105) position determination. As noted, other types of wireless nodes and base stations (e.g. an eNB or WiFi AP) may also be configured to transmit PRS signals configured in a manner similar to (or the same as) that depicted in FIGS. 6 and 7. Since transmission of a PRS by a wireless node or base station is directed to all UEs within radio range, a wireless node or base station can also be considered to transmit (or broadcast) a PRS. Further, in some implementations, a directional PRS, as described in relation to FIGS. 1-5, may have a frame configuration similar to or the same as that shown and described for FIGS. 6 and 7.

A PRS, which has been defined in 3GPP LTE Release-9 and later releases, may be transmitted by wireless nodes (e.g. eNBs, ng-eNB 114) after appropriate configuration (e.g., by an Operations and Maintenance (O&M) server). A PRS may be transmitted in special positioning subframes that are grouped into positioning occasions. For example, in LTE, a PRS positioning occasion can comprise a number $N_{PRS}$ of consecutive positioning subframes where the number $N_{PRS}$ may be between 1 and 160 (e.g. may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 6 illustrates a periodicity of positioning occasions where $N_{PRS}$ equals 4 618 and $T_{PRS}$ is greater than or equal to 20 620. In some embodiments, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g. at a constant power). Muting may aid signal acquisition and TOA and RSTD measurement, by UEs (such as the UE 105 depicted in FIGS. 1 and 5 and the UE 420 in FIG. 4), of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g. using LPP or NPP) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS ID for a cell or TP (denoted as $N_{ID}^{PRS}$) or as a function of a Physical Cell Identifier (PCI) (denoted as $N_{ID}^{cell}$) if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

As discussed herein (e.g. for actions 511, 512 and 513 of signaling flow 500), in some embodiments, OTDOA assistance data may be provided to a UE 105 by a location server (e.g., the LMF 120 of FIG. 1, an E-SMLC, etc.) for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method (e.g. ECID).

PRS-based positioning by a UE 105 may be facilitated by indicating the serving cell for the UE 105 in the OTDOA assistance data (e.g. with the reference cell indicated as being the serving cell). In the case of a UE 105 with 5G wireless access, the reference cell may be chosen by the LMF 120 as some cell (e.g. supported by a gNB 110) with good coverage at the expected approximate location of the UE 105 (e.g., as indicated by the known 5G serving cell for the UE 105).

In some embodiments, OTDOA assistance data may also include "expected RSTD" parameters, which provide the UE 105 with information about the RSTD values the UE 105 is expected to measure at its current location between the reference cell and each neighbor cell, together with an uncertainty of the expected RSTD parameter. The expected RSTD, together with the associated uncertainty, may define a search window for the UE 105 within which the UE 105 is expected to measure the RSTD value. OTDOA assistance information may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to measure a signal Time of Arrival (TOA) or RSTD.

Using the RSTD measurements, the known absolute or relative transmission timing of each cell, and the known position(s) of wireless node physical transmitting antennas for the reference and neighboring cells, the UE 105's position may be calculated (e.g., by the UE 105, by the LMF 120, or by some other node such as a gNB 110 or ng-eNB 114). More particularly, the RSTD for a neighbor cell "k" relative to a reference cell "Ref", may be given as ($TOA_k$–$TOA_{Ref}$), where the TOA values may be measured modulo one subframe duration (1 ms) to remove the effects of measuring different subframes at different times. TOA measurements for different cells may then be converted to RSTD measurements (e.g. as defined in 3GPP TS 36.214 entitled "Physical layer; Measurements") and sent to the location server (e.g., the LMF 120 or an E-SMLC) by the UE 105. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 105's position may be determined.

Figure 7:
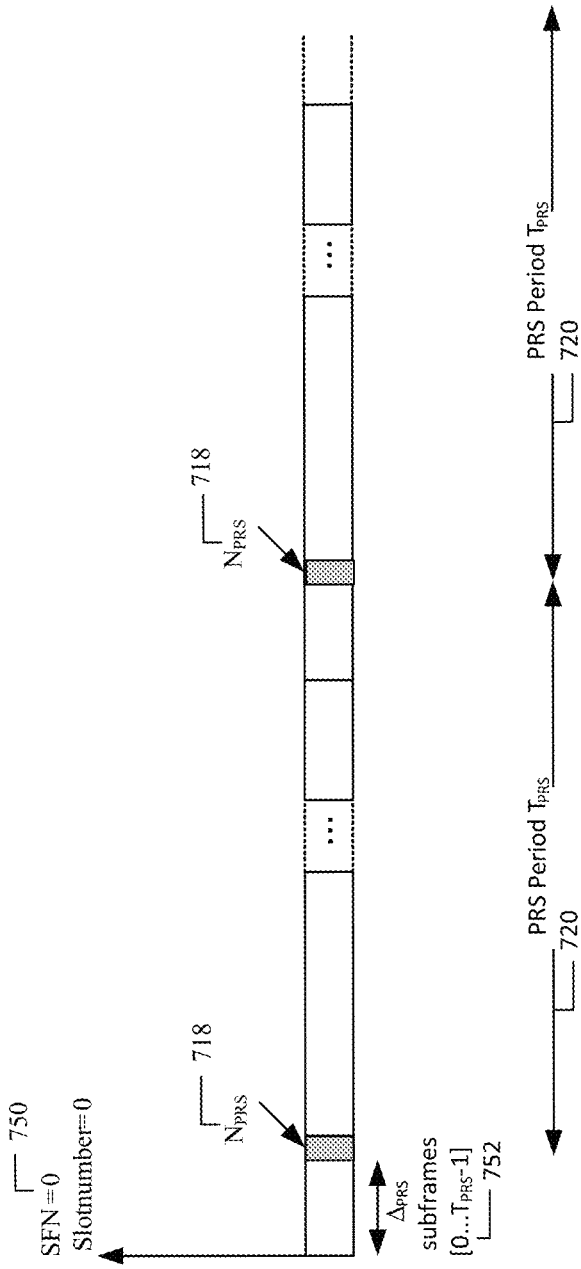
FIG. 7 is a diagram illustrating further aspects of PRS transmission for a cell supported by a wireless node.

FIG. 7 illustrates further aspects of PRS transmission for a cell supported by a wireless node (such as an ng-eNB 114 or a gNB 110). Again, PRS transmission for LTE is assumed in FIG. 7 although the same or similar aspects of PRS transmission to those shown in and described for FIG. 7 may apply to 5G, NR and/or other wireless technologies. FIG. 7 shows how PRS positioning occasions are determined by a System Frame Number (SFN), a cell specific subframe offset ($\Delta_{PRS}$)) and the PRS Periodicity ($T_{PRS}$) 720. Typically, the cell specific PRS subframe configuration is defined by a "PRS Configuration Index" $I_{PRS}$ included in the OTDOA assistance data. The PRS Periodicity ($T_{PRS}$) 720 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |

TABLE 1-continued

| PRS configuration Index $I_{PRS}$ | PRS periodicity $T_{PRS}$ (subframes) | PRS subframe offset $\Delta_{PRS}$ (subframes) |
|---|---|---|
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \quad (1)$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity, and $\Delta_{PRS}$ is the cell-specific subframe offset.

As shown in FIG. 7, the cell specific subframe offset $\Delta_{PRS}$ 752 may be defined in terms of the number of subframes transmitted starting from System Frame Number 0 (Slot 'Number 0', marked as slot 750) to the start of the first (subsequent) PRS positioning occasion. In FIG. 7, the number of consecutive positioning subframes 718 ($N_{PRS}$) equals 4.

In some embodiments, when a UE 105 receives a PRS configuration index $I_{PRS}$ in the OTDOA assistance data for a particular cell, the UE 105 may determine the PRS periodicity $T_{PRS}$ and PRS subframe offset $\Delta_{PRS}$ using Table 1. The UE 105 may then determine the radio frame, subframe and slot when a PRS is scheduled in the cell (e.g., using equation (1)). The OTDOA assistance data may be determined by, for example, the LMF 120 or an E-SMLC and includes assistance data for a reference cell, and a number of neighbor cells supported by various wireless nodes.

Typically, PRS occasions from all cells in a network that use the same frequency are aligned in time and may have a fixed known time offset relative to other cells in the network that use a different frequency. In SFN-synchronous networks all wireless nodes (e.g. gNBs, ng-eNBs, eNBs, etc.) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 105 may determine the timing of the PRS occasions (e.g., in an LTE network or a 5G network such as that in communication system 100) of the reference and neighbor cells for OTDOA positioning, if the UE 105 can obtain the cell timing (e.g., SFN or Frame Number) of at least one of the cells, e.g., the reference cell or a serving cell (e.g. which may be performed as part of action 516 in FIG. 5). The timing of the other cells may then be derived by the UE 105 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355. A directional PRS (e.g. as described in association with FIGS. 1-5) may be configured as just described according to 3GPP TSs and may, for example, use a low PRS duty cycle (e.g. $N_{PRS}=1$, $T_{PRS}=160$ subframes) or a high duty cycle.

Figure 8:
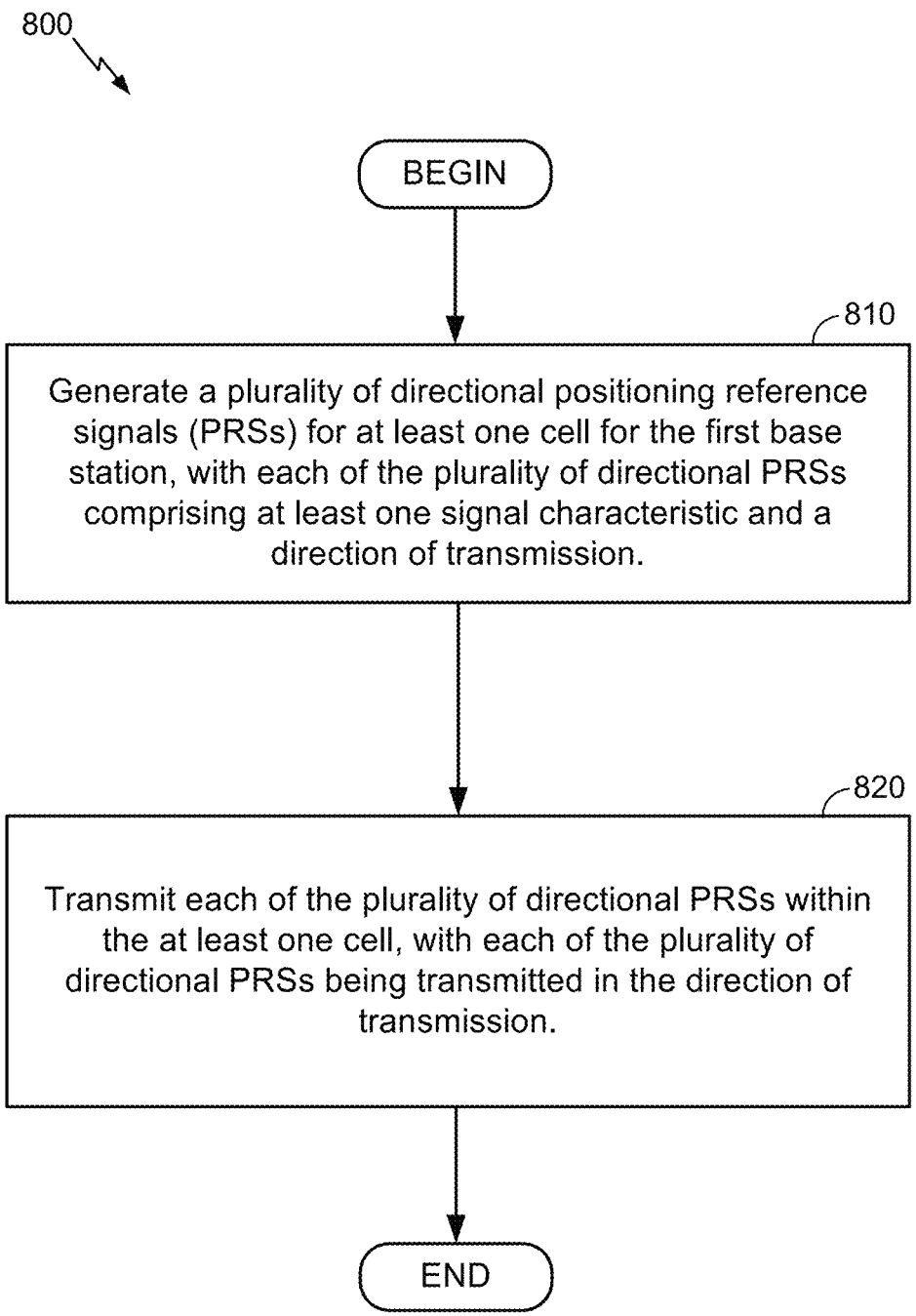
FIG. 8 is a flowchart of an example procedure, generally performed at a network node, to support and facilitate positioning of a mobile device.

FIG. 8 shows a flowchart of an example procedure 800, performed at a first base station, configured to transmit signaling (e.g., according to LTE, NR or 5G protocols), to support and facilitate positioning of a mobile device (e.g. the UE 105 or UE 420). The procedure 800 may be performed by a base station such as the base station 410 in FIG. 4, the base station 202 in FIG. 2, an eNB for LTE, a gNB for 5G or NR such as a gNB 110 in FIG. 1, or an ng-eNB for 5G such as ng-eNB 114 in FIG. 1. The procedure 800 may also be supported by a positioning only beacon that transmits signals (e.g. NR or LTE signals) but does not receive signals.

The procedure 800 includes generating at block 810 (by the first base station) a plurality of directional positioning reference signals (PRSs) for at least one cell for the first base station, with each of the plurality of directional PRSs comprising at least one signal characteristic and a direction of transmission. The at least one cell may be a serving cell for the mobile device. In an embodiment, at least one of the at least one signal characteristic and the direction of transmission may be unique (e.g. may be different to a corresponding at least one signal characteristic and/or a corresponding direction of transmission, respectively, for any other directional PRS transmitted for the at least one cell, by the first base station or by other nearby base stations).

The procedure 800 further includes transmitting at block 820 each of the plurality of directional PRSs within the at least one cell, wherein each of the plurality of directional PRSs is transmitted in the direction of transmission. The at least one signal characteristic for any directional PRS in the plurality of directional PRSs may indicate the direction of transmission for that directional PRS. For example, the at least one signal characteristic may identify the directional PRS, and may thereby indicate a known direction of transmission for this directional PRS, due to being different to a corresponding at least one signal characteristic for any other directional PRS in the plurality of directional PRSs. Thus, the at least one signal characteristic may be used to reduce or remove, for example, multipath interference, or to otherwise facilitate location determination for the mobile device as described in relation to FIGS. 3A-4.

The at least one signal characteristic may comprise, for example, a frequency (e.g. a carrier frequency), a frequency shift, a code sequence, a muting pattern, a transmission time or set of transmission times, or some combination of these. In some embodiments, transmitting the plurality of directional PRSs at block 820 may include directing the plurality of directional PRSs through a controllable antenna array (of the base station) configured to beamform each directional PRS in the respective direction of transmission. In some embodiments, the direction of transmission (for a particular directional PRS) may include a first angle from a continuous range of horizontal angles, and/or a second angle from a continuous range of vertical angles. In some embodiments, the direction of transmission for a particular directional PRS may comprise a continuous range of horizontal angles, a continuous range of vertical angles, or a combination thereof. In some embodiments, the direction of transmission for a particular directional PRS may be selected from a set of discrete directions of transmission (e.g., represented as an angle or a plurality of angles). The directional PRSs may be transmitted in substantially non-overlapping directions that are each associated with the at least one signal characteristic that allows identification of each directional PRS (and thus allows determination of the direction of transmission for each directional PRS).

In some embodiments, at least one of the plurality of directional PRSs transmitted at block 820 may be detectable by the mobile device to facilitate location determination of the mobile device at a location-capable device based on an observed time difference of arrival (OTDOA) position method, an angle of departure (AOD) position method, and/or an Enhanced Cell ID (ECID) position method. Other position methods that utilize the transmitted directional PRS signals may also be used. As noted, a location determination operation at a location-capable device may be performed at one or more of, for example, the first base station (transmitting the directional PRS), a second base station different to the first base station, the mobile device, a location server (e.g., an LMF 120, an SLP or an E-SMLC), and/or other types of devices. In these embodiments, the first base station may send the direction of transmission for the at least one of the plurality of directional PRSs and/or other configuration parameters and signals characteristics for the at least one of the plurality of directional PRSs to the location-capable device—e.g. as at actions 509 and 510 in signaling flow 500 when LMF 120 is the location-capable device or as at action 511 when UE 105 is the location-capable device.

In embodiments where at least one of the plurality of directional PRSs transmitted at block 820 is detectable by the mobile device to facilitate location determination of the mobile device at a location-capable device, the at least one of the plurality of directional PRSs may be detectable by the mobile device based on the direction of transmission for the at least one of the plurality of directional PRSs, the at least one signal characteristic for the at least one of the plurality of directional PRSs, or a combination thereof. For example, the at least one signal characteristic for the at least one of the plurality of directional PRSs may be used by the mobile device to acquire and measure the at least one of the plurality of directional PRSs. For example, the mobile device may integrate the directional PRS signal using coherent or non-coherent integration over a period of time such as the duration of one positioning occasion and may compare or correlate the integrated signal with an expected signal that has the same at least one signal characteristic, which may enable the mobile device to detect and measure the directional PRS. In some of these embodiments, the at least one signal characteristic may comprise a single signal characteristic that is different from a corresponding single signal characteristic for other PRS and/or other directional PRS signals that may be received by the mobile device. Alternatively, in some of these embodiments, the at least one signal characteristic may comprise a combination of two or more signal characteristics that are collectively different from a corresponding combination of two or more signal characteristics for other PRS and/or other directional PRS signals that may be received by the mobile device. In some of these embodiments, the mobile device may use the direction of transmission for the at least one of the plurality of directional PRSs detectable by the mobile device to detect this directional PRS by using multiple antennas or an antenna array to selectively receive only signals transmitted in the direction of transmission for this directional PRS as described in association with FIG. 4.

In some embodiments, the procedure 800 may further comprise sending at least one of the direction of transmission or the at least one signal characteristic for at least one of the plurality of directional PRSs to the mobile device. The sending may be based on broadcast within the at least one cell or on point to point transfer—e.g. as described for action 511 in signaling flow 500 in the case of broadcast.

In embodiments where at least one of the plurality of directional PRSs transmitted at block 820 is detectable by the mobile device to facilitate location determination of the mobile device at a location-capable device, the location determination operation at the location-capable device may include determining a presence or absence of multipath for the at least one of the plurality of directional PRSs based on the associated direction of transmission for the at least one of the plurality of directional PRSs and an approximate location for the mobile device. Here, determining the location of the mobile device at the location-capable device may be based, at least in part, on the determined presence or absence of multipath. For example, and a described for FIG. 4, when a presence of multipath is determined, determining the location of the mobile device may include disregarding (e.g. ignoring) the at least one of the plurality of directional PRSs transmitted at block 820. Conversely, and as also described for FIG. 4, when an absence of multipath is determined, determining the location of the mobile device may include using the at least one of the plurality of directional PRSs transmitted at block 820 (e.g. using a measurement obtained by the mobile device for the at least one of the plurality of directional PRSs). The approximate location for the mobile device may be based, at least in part, on a serving cell for the mobile device or on a previous determination of the location of the mobile device. For example, the previous determination may be based, at least in part, on the at least one of the plurality of directional PRSs transmitted at block 820 and detectable by the mobile device (e.g. based on a measurement obtained by the mobile device for the at least one of the plurality of directional PRSs).

Figure 9:
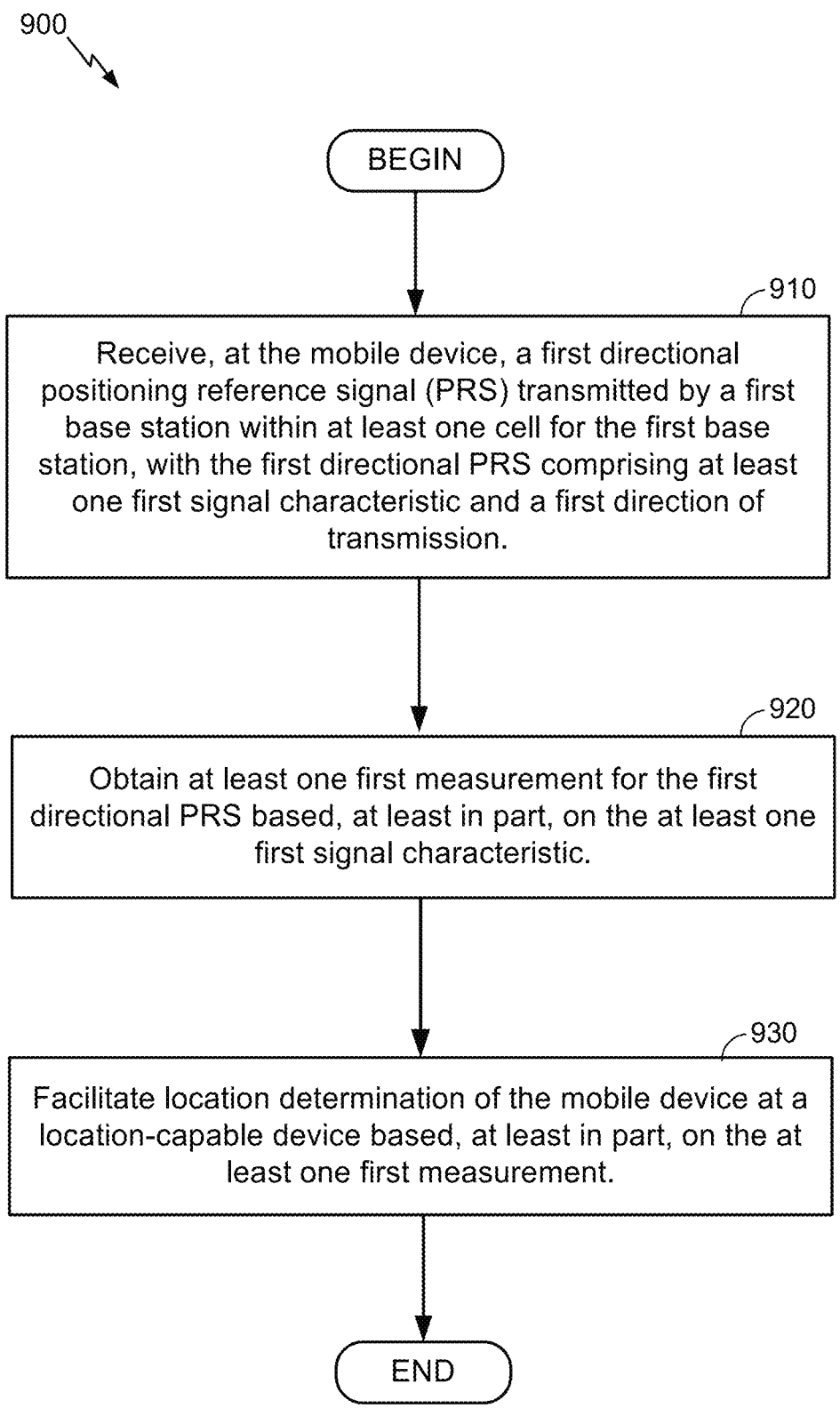
FIG. 9 is a flowchart of an example procedure, generally performed at a mobile device, to facilitate positioning of the mobile device.

FIG. 9 shows a flowchart of an example procedure 900, generally performed at a mobile device (e.g., a UE such as the UE 105 in FIGS. 1 and 5 or the UE 420 in FIG. 4), for supporting positioning of the mobile device. The procedure 900 includes receiving at block 910, at the mobile device, a first directional positioning reference signal (PRS) transmitted by a first base station (e.g. a gNB 110, an ng-eNB 114 or an eNB) within at least one cell for the first base station, with the first directional PRS comprising at least one first signal characteristic and a first direction of transmission. The at least one cell may be a serving cell for the mobile device—e.g. if the first base station is gNB 110-1 in FIG. 1 and the mobile device is UE 105. As noted, the at least one first signal characteristic may include one or more of, for example, a carrier frequency, a frequency shift (e.g. a vshift), a code sequence (e.g. a PRS code sequence), a muting pattern, a bandwidth, and/or a transmission time (or a set of transmission times). In some embodiments, the first directional PRS is transmitted from the first base station through a controllable antenna array configured to beamform the first directional PRS in the first direction of transmission. As also noted, the first direction of transmission may include (or be defined) by a direction with a continuous range of horizontal angles, and/or a continuous range of vertical angles.

With continued reference to FIG. 9, the procedure 900 further includes obtaining at block 920 at least one first measurement for the first directional PRS based, at least in part, on the at least one first signal characteristic. Block 920 may correspond to action 516 or part of action 516 in signaling flow 500. The at least one first measurement for the first directional PRS obtained at block 920 may include, for example, a Time Of Arrival (TOA), a Reference Signal Time Difference (RSTD), a Received Signal Strength Indication (RSSI), a Reference Signal Received Power (RSRP), a Reference Signal Received Quality (RSRQ), an Angle of Arrival (AOA), a signal propagation time, a round trip signal propagation time (RTT), a detection of the at least one first signal characteristic, and/or any combination of these. The at least one first signal characteristic for the first directional PRS may be used by the mobile device to acquire and measure the first directional PRS signal at block 920. For example, the mobile device may integrate the first directional PRS and other received signals using coherent or non-coherent integration over a period of time such as the duration of one PRS positioning occasion and may compare or correlate the integrated signal with an expected signal that has the same at least one first signal characteristic, which may enable the mobile device to detect and measure the first directional PRS. In some embodiments, the at least one first signal characteristic may comprise a single signal characteristic that is different from a corresponding single signal characteristic for other PRS and/or other directional PRS signals that may also be received by the mobile device. In other embodiments, the at least one first signal characteristic may comprise a combination of two or more signal characteristics that are collectively different from a corresponding combination of two or more signal characteristics for other PRS and/or other directional PRS signals that may be received by the mobile device. In some embodiments, the mobile device may use the first direction of transmission for the first directional PRS to acquire and measure the first directional PRS at block 920 by using multiple antennas or an antenna array to selectively receive only signals transmitted in the first direction of transmission as described in association with FIG. 4. In some embodiments, the at least one first signal characteristic for the first directional PRS may be received by the mobile device (e.g. prior to performing block 920) from the first base station (e.g. as described for action 511 of signaling flow 500) or from a location server such as an E-SMLC, SLP or LMF 120 (e.g. as described for actions 512 and 513 of signaling flow 500).

The procedure 900 further includes facilitating at block 930 location determination of the mobile device at a location-capable device based, at least in part, on the at least one first measurement. The location determination for block 930 may correspond to action 519 in signaling flow 500. As discussed herein, the location-capable device, where at least some of the location determination operations may be performed, may include one or more of, for example, the mobile device, the first base station, some other base station, and/or a location server (e.g. the LMF 120 of FIG. 1, an E-SMLC, an SLP, etc.) The location determination of the mobile device at the location-capable device may be based on, for example, an observed time difference of arrival (OTDOA) position method, an angle of departure (AOD)

position method, an Enhanced Cell ID (ECID) position method, or on some combination of these, and may employ one or more of the techniques described herein in association with FIGS. 3A, 3B and 4. When the location-capable device corresponds to the first base station or a location server (e.g. an E-SMLC, SLP or LMF 120), facilitating the location determination in block 930 may include sending the at least one first measurement for the first directional PRS to the location-capable device—e.g. as at actions 517 and 518 in signaling flow 500 when the location-capable device is LMF 120.

In some embodiments, location determination of the mobile device at the location-capable device may include determining a presence or absence of multipath for the first directional PRS based on the first direction of transmission for the first directional PRS and an approximate location for the mobile device. Here, determining the location of the mobile device may be based, at least in part, on the determined presence or absence of multipath. For example, and as described for FIG. 4, when a presence of multipath is determined, determining the location of the mobile device may include disregarding (e.g. ignoring) the at least one first measurement obtained at block 920. Conversely, and as also described for FIG. 4, when an absence of multipath is determined, determining the location of the mobile device may include using the at least one first measurement obtained at block 920 in the location determination. The approximate location for the mobile device may be based, at least in part, on a serving cell for the mobile device or on a previous determination of the location of the mobile device based, at least in part, on the at least one first measurement.

In some embodiments, location determination of the mobile device may be implemented based on measurements by the mobile device of multiple directional PRS signals. Thus, in such embodiments, the procedure 900 may further include receiving, at the mobile device, a second directional PRS transmitted by a second base station within at least one cell for the second base station, with the second directional PRS including at least one second signal characteristic and a second direction of transmission, and with the at least one second signal characteristic and the second direction of transmission for the second directional PRS being, respectively, different from the at least one first signal characteristic and the first direction of transmission for the first directional PRS. The procedure 900, in such embodiments, may also include obtaining at least one second measurement for the second directional PRS based, at least in part, on the at least one second signal characteristic for the second directional PRS, and facilitating location determination of the mobile device at the location-capable device based, at least in part, on the at least one first measurement and the at least one second measurement.

In some embodiments of the procedure 900, at least one of the at least one first signal characteristic and the first direction of transmission may be unique (e.g. may be different to a corresponding signal characteristic and/or corresponding direction of transmission, respectively, for any other directional PRS transmitted within the at least one cell, by the first base station or by some other nearby base station).

Figure 10:
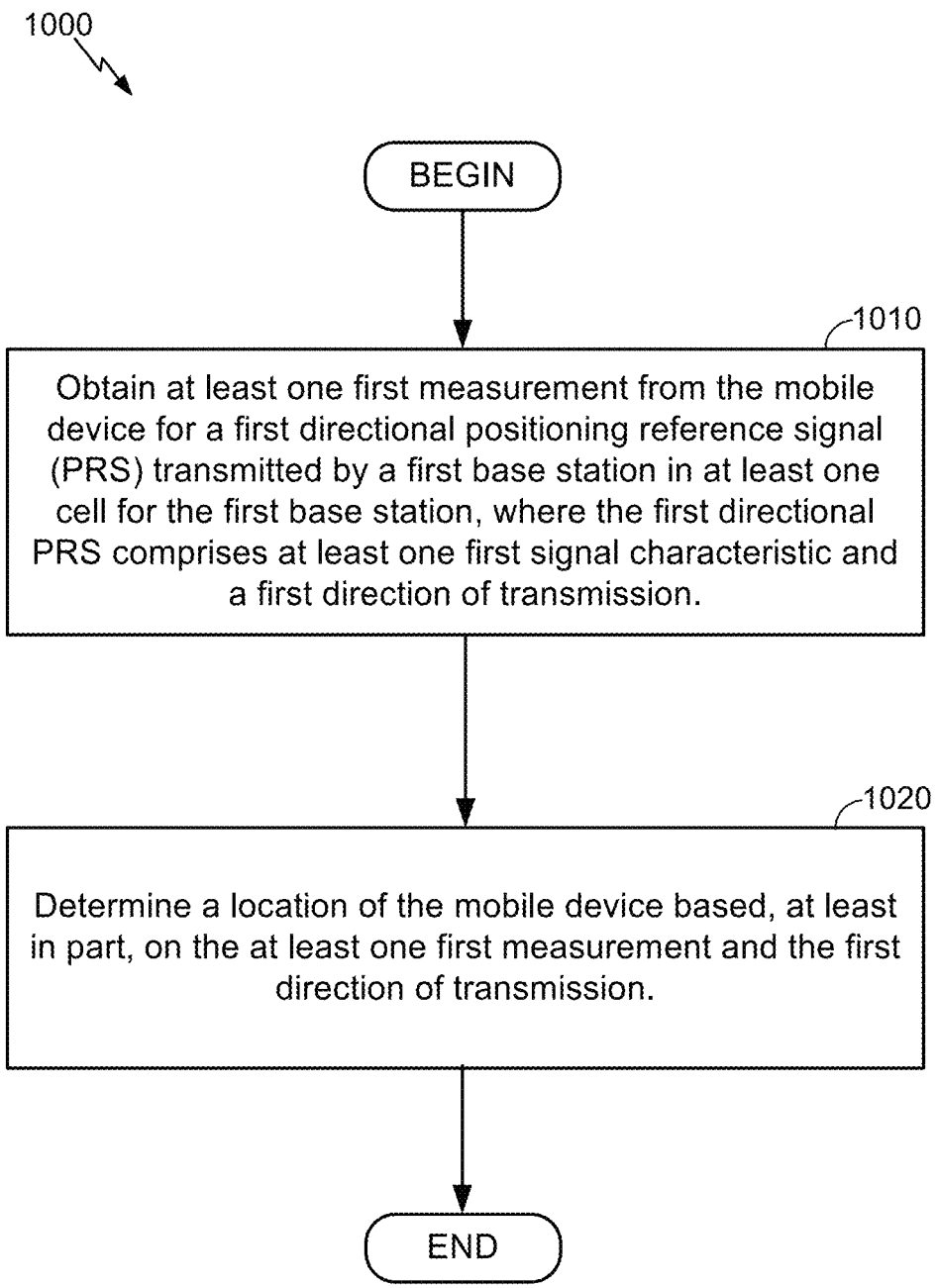
FIG. 10 is a flowchart of an example procedure, generally performed at a location-capable device, to facilitate positioning of a mobile device.

FIG. 10 shows a flowchart of an example procedure 1000, generally performed at a location-capable device for supporting positioning of a mobile device such as the UE 105 of FIGS. 1 and 5 or the UE 420 of FIG. 4. The procedure 1000 may be performed by the mobile device, by a base station such as an eNB, ng-eNB 114 or a gNB 110, or by a location server such as an E-SMLC, SLP or the LMF 120.

The procedure 1000 includes obtaining at block 1010 at least one first measurement from the mobile device for a first directional positioning reference signal (PRS) transmitted by a first base station in at least one cell for the first base station, where the first directional PRS comprises at least one first signal characteristic and a first direction of transmission. The at least one cell may be a serving cell for the mobile device—e.g. if the first base station corresponds to gNB 110-1 and the mobile device corresponds to UE 105. The at least one first measurement may be obtained at block 1010 directly if the location-capable device is the mobile device, or may be obtained at block 1010 by being received at the location-capable device from the mobile device if the location-capable device is a base station (e.g. the first base station) or a location server (e.g. the LMF 120). For example, the at least one first measurement may be received from the mobile device in an Radio Resource Control (RRC) message if the location-capable device is a base station or may be received from the mobile device in an LPP, NPP or NRPP message if the location-capable device is a location server (e.g. as described for actions 517 and 518 for signaling flow 500 for a location server corresponding to LMF 120).

The procedure 1000 further includes determining at block 1020 a location of the mobile device based, at least in part, on the at least one first measurement and the first direction of transmission. In some embodiments where the location-capable device is a location server (e.g. LMF 120), block 1020 may correspond to action 519 in signaling flow 500.

As discussed herein, the at least one first signal characteristic may comprise a carrier frequency, a frequency shift (e.g. a vshift), a code sequence (e.g. a PRS code sequence), a muting pattern, a bandwidth, a transmission time (or a set of transmission times), or some combination of these. The first direction of transmission may include a continuous range of horizontal angles, and/or a continuous range of vertical angles. In some embodiments, the first directional PRS may be transmitted from the first base station through a controllable antenna array configured to beamform the first directional PRS in the first direction of transmission. The at least one first measurement for the first directional PRS may include a Time Of Arrival (TOA), a Reference Signal Time Difference (RSTD), a Received Signal Strength Indication (RSSI), a Reference Signal Received Power (RSRP), a Reference Signal Received Quality (RSRQ), an Angle of Arrival (AOA), a signal propagation time, a round trip signal propagation time (RTT), a detection of the at least one first signal characteristic, and/or some combination of these.

In some embodiments, the location-capable device may include the mobile device, and the procedure 1000 may further include, in such embodiments, receiving the at least one first signal characteristic and/or the first direction of transmission from the first base station or from a location server such as an E-SMLC, SLP or an LMF (e.g. LMF 120). The at least one first signal characteristic and/or the first direction of transmission may be received from the first base station by receiving a broadcast signal from the first base station—e.g. as described for action 511 in signaling flow 500. The at least one first signal characteristic and/or the first direction of transmission may be received from a location server (e.g. LMF 120) by receiving an LPP or NPP message from the location server—e.g. as described for actions 512 and 513 in signaling flow 500.

In some embodiments, the location-capable device may include the first base station or a location server (e.g. an E-SMLC, SLP or the LMF 120), and, in such embodiments, the procedure 1000 may further include sending the at least one first signal characteristic and/or the first direction of transmission to the mobile device. For example, when the location-capable device includes the first base station, the at least one first signal characteristic and/or the first direction of transmission may be sent to the mobile station using broadcasting—e.g. as described for action 511 in signaling flow 500. For example, when the location-capable device includes the location server (e.g. LMF 120), the at least one first signal characteristic and/or the first direction of transmission may be sent to the mobile device in an LPP or NPP message—e.g. as described for actions 512 and 513 in signaling flow 500.

In some embodiments, and as described previously herein, the at least one first signal characteristic and/or the first direction of transmission may enable or assist the mobile device to acquire and measure the first directional PRS and to obtain the at least one first measurement of the first directional PRS (e.g. at block 1010 if the mobile device is the location-capable device or prior to block 1010 if the location-capable device includes the first base station or a location server). For example, the mobile device may integrate the first directional PRS and other received signals using coherent or non-coherent integration over a period of time such as the duration of one PRS positioning occasion and may compare or correlate the integrated signal with an expected signal that has the same at least one first signal characteristic, which may enable the mobile device to detect and measure the first directional PRS.

In some embodiments, determining the location of the mobile device at block 1020 may be based on an observed time difference of arrival (OTDOA) position method, an angle of departure (AOD) position method, an Enhanced Cell ID (ECID) position method, or on some combination of these. The procedure 1000 may also include, in such embodiments, determining a presence or absence of multipath for the first directional PRS based on the first direction of transmission and an approximate location for the mobile device, where determining the location of the mobile device is based, at least in part, on the determined presence or absence of multipath. For example, and as described for FIG. 4, when a presence of multipath is determined, determining the location of the mobile device at block 1020 may include disregarding (e.g. ignoring) the at least one first measurement obtained at block 1010. Conversely, and as also described for FIG. 4, when an absence of multipath is determined, determining the location of the mobile device at block 1020 may include using the at least one first measurement obtained at block 1010 in the location determination at block 1020. The approximate location for the mobile device may be based, at least in part, on a serving cell for the mobile device or on a previous determination of the location of the mobile device based, at least in part, on the at least one first measurement obtained at block 1010.

In some embodiments, location determination of the mobile device at block 1020 may be implemented based on measurements by the mobile device of multiple directional PRS signals. Thus, in such embodiments, the procedure 1000 may further include obtaining at least one second measurement from the mobile device for a second directional PRS transmitted by a second base station in at least one cell for the second base station, with the second directional PRS including at least one second signal characteristic and a second direction of transmission, and with the at least one second signal characteristic and the second direction of transmission for the second directional PRS being, respectively, different from the at least one first signal characteristic and the first direction of transmission for the first directional PRS. In such embodiments, the procedure 1000 may also include determining the location of the mobile device based, at least in part, on the at least one first measurement, the at least one second measurement, the first direction of transmission for the first directional PRS and the second direction of transmission for the second directional PRS.

In some embodiments of the procedure 1000, at least one of the at least one first signal characteristic and the first direction of transmission for the first directional PRS may be unique (e.g. may be different to a corresponding signal characteristic and/or corresponding direction of transmission, respectively, for any other directional PRS transmitted within the at least one cell, by the first base station or by some other nearby base station).

Figure 11:
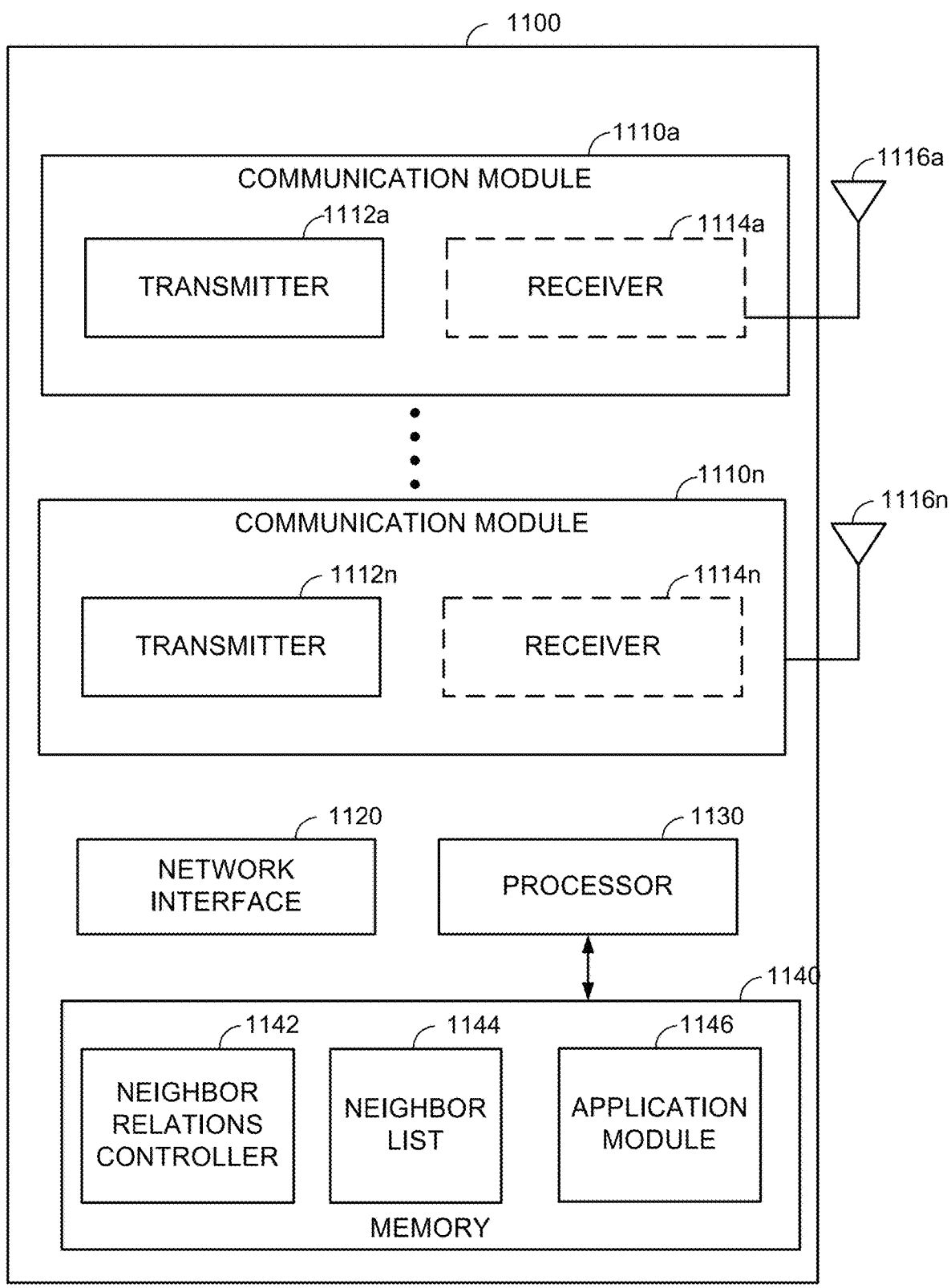
FIG. 11 is a schematic diagram of an example wireless node (such as a base station, access point, or server).

FIG. 11 shows a schematic diagram of an example wireless node 1100, such as a base station, access point, or server, which may be similar to, and be configured to have a functionality similar to that, of any of the various nodes depicted, for example, in FIGS. 1, 2, 4 and 5 (e.g., the gNBs 110-1 and 110-2, the ng-eNB 114, base station 202, base station 410, LMF 120, components of the 5GC 140), or otherwise discussed herein (e.g. such as an E-SMLC or SLP). The wireless node 1100 may include one or more communication modules 1110a-n, which may be electrically coupled to one more antennas 1116a-n for communicating with wireless devices, such as, for example, the UE 105 of FIGS. 1 and 5. Each of the communication modules 1110a-1110n may include a respective transmitter 1112a-n for sending signals (e.g., downlink messages, which may be arranged in frames, and may include directional positioning reference signals such as those described herein) and, optionally (e.g., for nodes configured to receive and process uplink communications) a respective receiver 1114a-n. In embodiments in which the implemented node includes both a transmitter and a receiver, the communication module comprising the transmitter and receiver may be referred to as a transceiver. The node 1100 may also include a network interface 1120 to communicate with other network nodes via wireline means (e.g., by sending and receiving queries and responses). For example, the node 1100 may be configured to communicate (e.g., via wired or wireless backhaul communication) with a gateway, or other suitable device of a network, to facilitate communication with one or more core network nodes (e.g., any of the other nodes and elements shown in FIGS. 1 and 5). Additionally, and/or alternatively, communication with other network nodes may also be performed using the communication modules 1110a-n and/or the respective antennas 1116a-n.

The node 1100 may also include other components that may be used with embodiments described herein. For example, the node 1100 may include, in some embodiments, a processor (also referred to as a controller) 1130 to manage communications with other nodes (e.g., sending and receiving messages), to generate communication signals (including to generate directional PRS signals), and to provide other related functionality, including functionality to implement the various processes and methods described herein. Thus, for example, the processor, in combination with other modules/units of the node 1100, may be configured to cause the node 1100, when functioning as a base station (e.g. a gNB 110 or ng-eNB 114), to generate a plurality of directional positioning reference signals (PRSs) for at least one cell for the base station, with each of the plurality of directional PRSs including at least one signal characteristic and a direction of transmission, and transmit the each of the plurality of directional PRSs within the at least one cell, with each of the plurality of directional PRSs being transmitted in the direction of transmission. Similarly, for example, the processor, in combination with other modules/units of the node 1100, may be configured to cause the node 1110, when functioning as a location-capable device, to obtain at least one first measurement from a mobile device for a first directional positioning reference signal (PRS) transmitted by a base station in at least one cell for the base station, with the first directional PRS comprising at least one first signal characteristic and a first direction of transmission, and to determine a location of the mobile device based, at least in part, on the at least one first measurement and the first direction of transmission.

The processor 1130 may be coupled to (or otherwise communicate with) a memory 1140, which may include one or more modules (implemented in hardware of software) to facilitate controlling the operation of the node 1100. For example, the memory 1140 may include an application module 1146 with computer code for various applications required to perform the operation of the node 1100. For example, the processor 1130 may be configured (e.g., using code provided via the application module 1146, or some other module in the memory 1140) to control the operation of the antennas 1116*a-n* so as to adjustably control the antennas' transmission power and phase, gain pattern, antenna direction (e.g., the direction at which a resultant radiation beam from the antennas 1116*a-n* propagates), antenna diversity, and other adjustable antenna parameters for the antennas 1116*a-n* of the node 1100. Control of the antennas 1116*a-n* of the node 1100, which together constitute an antenna array for the node 1100, may allow, for example, directional PRS signals to be beamformed and transmitted in particular directions characterized, in part, by a direction angle and beamwidth. In some embodiments, the antennas' configuration may be controlled according to pre-stored configuration data provided at the time of manufacture or deployment of the node 1100, or according to data obtained from a remote device (such as a central server sending data representative of the antenna configuration, and other operational parameters, that are to be used for the node 1100). The wireless node 1100 may also be configured, in some implementations, to perform location data services, or perform other types of services, for multiple wireless devices (clients) communicating with the wireless node 1100 (or communicating with a server coupled to the wireless node 1100), and to provide location data and/or assistance data to such multiple wireless devices.

In addition, in some embodiments, the memory 1140 may also include neighbor relations controllers (e.g., neighbor discovery modules) 1142 to manage neighbor relations (e.g., maintaining a neighbor list 1144) and to provide other related functionality. In some embodiments, the node 1110 may also include one or more sensors (not shown) and other devices (e.g., cameras).

Figure 12:
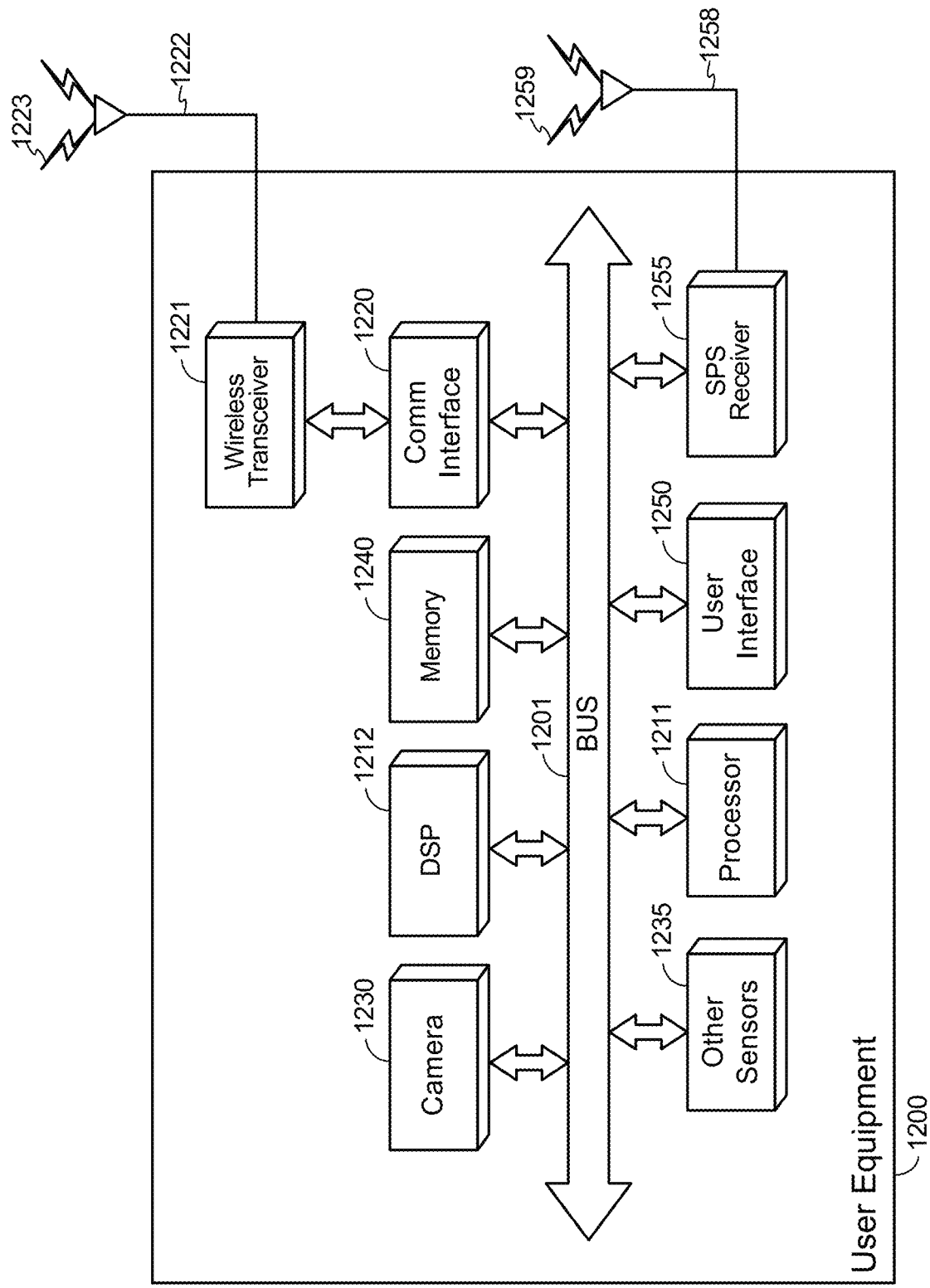
FIG. 12 is a schematic diagram of a mobile device (e.g., a UE).

FIG. 12 illustrates a user equipment (UE) 1200 for which various procedures and techniques described herein can be utilized. The UE 1200 may, in implementation and/or functionality, be similar to or the same as any of the other UEs described herein, including the UE 105 depicted in FIGS. 1 and 5 and the UE 420 in FIG. 4. Furthermore, the implementation illustrated in FIG. 12 may also be used to implement, at least in part, some of the nodes and devices illustrated throughout the present disclosure, including such nodes and devices as base stations (e.g. gNBs 110, ng-eNB 114, eNBs, etc.), location servers (e.g. LMF 120), and other components and devices illustrated in and described for FIGS. 1-10.

The UE 1200 includes a processor 1211 (or processor core) and memory 1240. As described herein, the UE 1200 is configured to detect and process directional positioning reference signals (PRS) that are used to facilitate location determination operations. The UE 1200 may optionally include a trusted environment operably connected to the memory 1240 by a public bus 1201 or a private bus (not shown). The UE 1200 may also include a communication interface 1220 and a wireless transceiver 1221 configured to send and receive wireless signals 1223 (which may include LTE or NR frames comprising directional PRS signals) via a wireless antenna 1222 over a wireless network (such as the NG-RAN 135 and 5GC 140 of FIG. 1). The wireless transceiver 1221 is connected to the bus 1201 via the communication interface 1220. Here, the UE 1200 is illustrated as having a single wireless transceiver 1221. However, the UE 1200 can alternatively have multiple wireless transceivers 1221 and/or multiple wireless antennas 1222 to support multiple communication standards such as WiFi, CDMA, Wideband CDMA (WCDMA), Long Term Evolution (LTE), 5G, NR, Bluetooth® short-range wireless communication technology, etc.

The communication interface 1220 and/or wireless transceiver 1221 may support operations on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 1200 may also include a user interface 1250 (e.g., display, keyboard, touchscreen, graphical user interface (GUI)), and a Satellite Positioning System (SPS) receiver 1255 that receives SPS signals 1259 (e.g., from SPS satellites) via an SPS antenna 1258 (which may be the same antenna as wireless antenna 1222 or may be different). The SPS receiver 1255 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 1255 measures the SPS signals 1259 and may use the measurements of the SPS signals 1259 to determine the location of the UE 1200. The processor 1211, memory 1240, Digital Signal Processor (DSP) 1212 and/or specialized processor(s) (not shown) may also be utilized to process the SPS signals 1259, in whole or in part, and/or to compute (approximately or more precisely) the location of the UE 1200, in conjunction with SPS receiver 1255. Alternatively, the UE 1200 may support transfer of the SPS measurements to a location server (e.g., E-SMLC, an LMF, such as the LMF 120 of FIG. 1, etc.) that computes the UE location instead. Storage of information from the SPS signals 1259 or other location signals is performed using a memory 1240 or registers (not shown). While only one processor 1211, one DSP 1212 and one memory 1240 are shown in FIG. 12, more than one of any, a pair, or all of these components could be used by the UE 1200. The processor 1211 and DSP 1212 associated with the UE 1200 are connected to the bus 1201.

The memory 1240 can include a non-transitory computer-readable storage medium (or media) that stores functions as one or more instructions or code. Media that can make up the memory 1240 include, but are not limited to, RAM, ROM, FLASH, disc drives, etc. In general, the functions stored by the memory 1240 are executed by general-purpose processor (s), such as the processor 1211, specialized processors, such as the DSP 1212, etc. Thus, the memory 1240 is a processor-readable memory and/or a computer-readable memory that stores software (programming code, instructions, etc.) configured to cause the processor(s) 1211 and/or DSP(s) 1212 to perform the functions described. Alternatively, one or more functions of the UE 1200 may be performed in whole or in part in hardware.

A UE 1200 can estimate its current position within an associated system using various techniques, based on other communication entities within view and/or information available to the UE 1200. For instance, the UE 1200 can estimate its position using information obtained from base stations (e.g. gNBs, ng-eNBs), access points (APs) associated with one or more wireless local area networks (WLANs), personal area networks (PANs) utilizing a short-range wireless communication technology such as Bluetooth® wireless technology or ZIGBEE®, etc., Global Navigation Satellite System (GNSS) or other Satellite Positioning System (SPS) satellites, and/or map data obtained from a map server or other server (e.g., an LMF, an E-SMLC or SLP). In some cases, a location server, which may be an E-SMLC, SLP, Standalone Serving Mobile Location Center (SAS), or an LMF, etc., may provide assistance data to the UE 1200 to allow or assist the UE 1200 to acquire signals (e.g. signals from WLAN APs, signals from cellular base stations (including directional PRS signals), GNSS satellites, etc.) and make location related measurements using these signals. The UE 1200 may then provide the measurements to the location server to compute a location estimate (which may be known as "UE assisted" positioning) or may compute a location estimate itself (which may be known as "UE based" positioning) based on the measurements and possibly based also on other assistance data provided by the location server (e.g. such as orbital and timing data for GNSS satellites, configuration parameters for the directional PRS signals, the precise location coordinates of WLAN APs and/or cellular base stations for use in OTDOA, AOD and/or ECID positioning, etc.)

In one embodiment, the UE 1200 may include a camera 1230 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 1230 may be configured to obtain and provide image information to assist in positioning of the UE 1200. In an example, one or more external image processing servers (e.g. remote servers) may be used to perform image recognition and provide location estimation processes. The UE 1200 may include other sensors 1235 which may also be used to compute, or used to assist in computing, a location for the UE 1200. The other sensors 1235 may include inertial sensors (e.g. accelerometers, gyroscopes, magnetometers, a compass, any of which may be implemented based on micro-electro-mechanical-system (MEMS), or based on some other technology), as well as a barometer, thermometer, hygrometer and other sensors.

As noted, in some embodiments the UE 1200 may be configured to receive (e.g., via the wireless transceiver 1221), a first directional positioning reference signal (PRS) transmitted by a first base station within at least one cell for the first base station, with the first directional PRS comprising at least one signal characteristic and a direction of transmission. In such embodiments, the UE 1200 may further be configured to obtain at least one first measurement for the first directional PRS based, at least in part, on the at least one signal characteristic, and to facilitate location determination of the UE 1200 at a location-capable device (which may include the UE 1200, and/or may further include the first base station, some other base station, a remote location server, etc.) based, at least in part, on the at least one first measurement.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A first base station, for supporting positioning of a mobile device, comprising:
    a memory;
    a transmitter; and
    at least one processor operably coupled to the memory and the transmitter and configured to:
        obtain at least one first signal characteristic of a first directional positioning reference signal (PRS), and a first direction of transmission of the first directional PRS, to be transmitted by the first base station;
        produce a second directional PRS that is unique relative to the first directional PRS by producing the second directional PRS to have at least one second signal characteristic that is different from the at least one first signal characteristic and to have a second direction of transmission that is different from the first direction of transmission;
        transmit, via the transmitter, the first directional PRS in the first direction of transmission and the second directional PRS in the second direction of transmission; and
        obtain at least one measurement from the mobile device for the first directional PRS based on assistance data for the first directional PRS as a line of sight directional PRS and no assistance data for the second directional PRS as a non-line of sight PRS.

2. The first base station of claim 1, wherein the at least one processor is configured to produce the second directional PRS that is unique relative to the first directional PRS by producing the second directional PRS such that the second directional PRS and the first directional PRS have different frequencies, or different frequency shifts, or different code sequences, or different muting patterns, or different transmission times, or any combination of any two or more thereof.

3. The first base station of claim 1, wherein the first direction of transmission and the second direction of transmission comprises a respective range of horizontal angles, or a respective range of vertical angles, or a combination thereof.

4. The first base station of claim 1, wherein the at least one processor is configured to send, via the transmitter to the mobile device, the at least one second signal characteristic of the second directional PRS.

5. A method, at a first base station, for supporting positioning of a mobile device, the method comprising:
    obtaining at least one first signal characteristic of a first directional positioning reference signal (PRS), and a first direction of transmission of the first directional PRS, to be transmitted by the first base station;
    producing a second directional PRS that is unique relative to the first directional PRS by producing the second directional PRS to have at least one second signal characteristic that is different from the at least one first signal characteristic and to have a second direction of transmission that is different from the first direction of transmission;
    transmitting, via a transmitter, the first directional PRS in the first direction of transmission and the second directional PRS in the second direction of transmission; and
    obtaining at least one measurement from the mobile device for the first directional PRS based on assistance data for the first directional PRS as a line of sight directional PRS and no assistance data for the second directional PRS as a non-line of sight PRS.

6. The method of claim 5, wherein producing the second directional PRS that is unique relative to the first directional PRS comprises producing the second directional PRS such that the second directional PRS and the first directional PRS have different frequencies, or different frequency shifts, or different code sequences, or different muting patterns, or different transmission times, or any combination of any two or more thereof.

7. The method of claim 5, wherein each of the first direction of transmission and the second direction of transmission comprises a respective range of horizontal angles, or a respective range of vertical angles, or a combination thereof.

8. The method of claim 5, further comprising sending, from the first base station to the mobile device, the at least one second signal characteristic of the second directional PRS.

9. A first base station, for supporting positioning of a mobile device, comprising:
    means for obtaining at least one first signal characteristic of a first directional positioning reference signal (PRS), and a first direction of transmission of the first directional PRS, to be transmitted by the first base station;
    means for producing a second directional PRS that is unique relative to the first directional PRS by producing the second directional PRS to have at least one second signal characteristic that is different from the at least one first signal characteristic and to have a second direction of transmission that is different from the first direction of transmission;

means for transmitting the first directional PRS in the first direction of transmission and the second directional PRS in the second direction of transmission; and means for obtaining at least one measurement from the mobile device for the first directional PRS based on assistance data for the first directional PRS as a line of sight directional PRS and no assistance data for the second directional PRS as a non-line of sight PRS.

10. The first base station of claim 9, wherein the means for producing the second directional PRS that is unique relative to the first directional PRS comprise means for producing the second directional PRS such that the second directional PRS and the first directional PRS have different frequencies, or different frequency shifts, or different code sequences, or different muting patterns, or different directions of transmission from the first base station, or any combination of any two or more thereof.

11. The first base station of claim 9, first direction of transmission and the second direction of transmission comprises a respective range of horizontal angles, or a respective range of vertical angles, or a combination thereof.

12. The first base station of claim 9, further comprising means for sending, to the mobile device, the at least one second signal characteristic of the second directional PRS.

13. A non-transitory processor-readable storage medium comprising processor-readable instructions configured to cause one or more processors of a first base station to support the positioning of a mobile device, comprising:

code for obtaining at least one first signal characteristic of a first directional positioning reference signal (PRS), and a first direction of transmission of the first directional PRS, to be transmitted by the first base station;

code for producing a second directional PRS that is unique relative to the first directional PRS by producing the second directional PRS to have at least one second signal characteristic that is different from the at least one first signal characteristic and to have a second direction of transmission that is different from the first direction of transmission;

code for transmitting the first directional PRS in the first direction of transmission and the second directional PRS in the second direction of transmission; and code for obtaining at least one measurement from the mobile device for the first directional PRS based on assistance data for the first directional PRS as a line of sight directional PRS and no assistance data for the second directional PRS as a non-line of sight PRS.

14. The non-transitory processor-readable storage medium of claim 13, wherein the code for producing the second directional PRS that is unique relative to the first directional PRS-comprises code for producing the second directional PRS such that the second directional PRS and the first directional PRS have different frequencies, or different frequency shifts, or different code sequences, or different muting patterns, or different transmission times, or any combination of any two or more thereof.

15. The non-transitory processor-readable storage medium of claim 13, wherein each of the first direction of transmission and the second direction of transmission comprises a respective range of horizontal angles, or a respective range of vertical angles, or a combination thereof.

16. The non-transitory processor-readable storage medium of claim 13, further comprising code for sending, to the mobile device, the at least one second signal characteristic of the second directional PRS.

* * * * *